(12) United States Patent
Davis et al.

(10) Patent No.: US 10,931,540 B2
(45) Date of Patent: Feb. 23, 2021

(54) CONTINUOUS DATA SENSING OF FUNCTIONAL STATES OF NETWORKED COMPUTING DEVICES TO DETERMINE EFFICIENCY METRICS FOR SERVICING ELECTRONIC MESSAGES ASYNCHRONOUSLY

(71) Applicant: Khoros, LLC, Austin, TX (US)

(72) Inventors: Shane Jackson Davis, Austin, TX (US); Jessica Marie Woods, Austin, TX (US); Adam Levi Poncher, Austin, TX (US)

(73) Assignee: Khoros, LLC, Austin, TX (US)

( * ) Notice: Subject to any disclaimer, the term of this patent is extended or adjusted under 35 U.S.C. 154(b) by 0 days.

(21) Appl. No.: 16/413,577

(22) Filed: May 15, 2019

(65) Prior Publication Data

US 2020/0366564 A1 Nov. 19, 2020

(51) Int. Cl.
 *G06F 3/048* (2013.01)
 *H04L 12/24* (2006.01)
 *H04L 29/08* (2006.01)

(52) U.S. Cl.
 CPC .......... *H04L 41/22* (2013.01); *H04L 67/1095* (2013.01); *H04L 67/12* (2013.01)

(58) Field of Classification Search
 None
 See application file for complete search history.

(56) References Cited

U.S. PATENT DOCUMENTS 6,041,311 A 3/2000 Chislenko et al.
6,146,026 A 11/2000 Ushiku
(Continued)

FOREIGN PATENT DOCUMENTS

CN 102054033 A 5/2011
WO 2009047674 A2 4/2009
(Continued)

OTHER PUBLICATIONS

Fiorillo, James N., Non-Final Office Action for U.S. Appl. No. 15/821,543 dated Aug. 16, 2019.
(Continued)

*Primary Examiner* — William C Trapanese
(74) *Attorney, Agent, or Firm* — Kokka & Backus, PC

(57) ABSTRACT

Various embodiments relate generally to data science and data analysis, computer software and systems, and wired and wireless network communications to interface among repositories of disparate data and computing machine-based entities configured to access, track, and/or analyze data, and, more specifically, to a computing and data storage platform to implement computerized tools to continuously (or nearly continuously) sense data describing functional states of remote computing devices and/or user interfaces configured to service electronic messages, according to at least some examples. For example, a method may include receiving a stream of data representing states of user interfaces, analyzing the states of the user interfaces, identifying activity data, identifying a state of an application, detecting an action and classifying a subset of activity data based on the action, and generating data representing a state of an application configured to interact with a digital conversation.

20 Claims, 9 Drawing Sheets

(56) References Cited

U.S. PATENT DOCUMENTS

| | | |
|---|---|---|
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,818,758 B2 | 10/2010 | Bonet et al. |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,752,041 B2 | 6/2014 | Akiyoshi et al. |
| 8,769,417 B1 | 7/2014 | Robinson et al. |
| 8,825,515 B1 | 9/2014 | Hanson |
| 8,886,580 B2 | 11/2014 | Grenier et al. |
| 8,892,524 B1 | 11/2014 | Lee et al. |
| 8,972,428 B2 | 3/2015 | Dicker et al. |
| 9,021,361 B1 | 4/2015 | Pettinati et al. |
| 9,105,044 B2 | 8/2015 | Wu |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,311,683 B1 | 4/2016 | Saylor et al. |
| 9,338,186 B2 | 5/2016 | Wollenstein et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,519,723 B2 | 12/2016 | Lorenz et al. |
| 9,596,206 B2 | 3/2017 | Bueno et al. |
| 9,619,531 B2 | 4/2017 | Wu |
| 9,756,098 B2 | 9/2017 | Kazerani et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,264,042 B2 | 4/2019 | Gordon |
| 10,284,723 B1 * | 5/2019 | Neuer, III ........... H04M 3/5175 |
| 2001/0025253 A1 | 9/2001 | Heintz et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0225850 A1 | 12/2003 | Teague |
| 2004/0174397 A1 | 9/2004 | Cereghini et al. |
| 2005/0060643 A1 | 3/2005 | Glass et al. |
| 2005/0132348 A1 | 6/2005 | Meulemans et al. |
| 2005/0206644 A1 | 9/2005 | Kincaid |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0206578 A1 | 9/2006 | Heidloff et al. |
| 2007/0083536 A1 | 4/2007 | Darnell et al. |
| 2007/0136354 A1 | 6/2007 | Chen |
| 2007/0171716 A1 | 7/2007 | Wright et al. |
| 2007/0226177 A1 | 9/2007 | Barsness et al. |
| 2007/0282800 A1 | 12/2007 | England et al. |
| 2007/0286528 A1 | 12/2007 | Podilchuk |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0215591 A1 | 9/2008 | Howard et al. |
| 2008/0221870 A1 | 9/2008 | Attardi et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292722 A1 | 11/2009 | Ayloo |
| 2009/0300036 A1 | 12/2009 | Nagasaki |
| 2010/0082503 A1 | 4/2010 | Kantak et al. |
| 2010/0106730 A1 | 4/2010 | Amin Ian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0169148 A1 | 7/2010 | Oberhofer et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0274732 A1 | 10/2010 | Grinchenko et al. |
| 2010/0287512 A1 | 11/2010 | Gan et al. |
| 2010/0306122 A1 | 12/2010 | Shaffer |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0289574 A1 | 11/2011 | Hull et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0158632 A1 | 6/2012 | Grenier et al. |
| 2012/0195422 A1 | 8/2012 | Famous |

(56) References Cited

U.S. PATENT DOCUMENTS

| | | |
|---|---|---|
| 2012/0208568 A1 | 8/2012 | Cooley |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0138428 A1 | 5/2013 | Chandramouli et al. |
| 2013/0159472 A1 | 6/2013 | Newton et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0200989 A1 | 7/2014 | Kassko et al. |
| 2014/0222834 A1 | 8/2014 | Parikh et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0358911 A1 | 12/2014 | McCarthy et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0161211 A1 | 6/2015 | Patel et al. |
| 2015/0170294 A1 | 6/2015 | Goyal et al. |
| 2015/0193504 A1 | 7/2015 | Naidu et al. |
| 2015/0286643 A1 | 10/2015 | Kumar et al. |
| 2015/0295869 A1 | 10/2015 | Li et al. |
| 2015/0310018 A1 | 10/2015 | Fan et al. |
| 2015/0312200 A1 | 10/2015 | Brav et al. |
| 2015/0381552 A1 | 12/2015 | Vijay et al. |
| 2016/0034551 A1 | 2/2016 | Huang et al. |
| 2016/0042053 A1 | 2/2016 | Webber |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | N et al. |
| 2016/0151704 A1 | 6/2016 | Wu |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0180294 A1 | 6/2017 | Milligan et al. |
| 2018/0053114 A1 | 2/2018 | Adjaoute |
| 2018/0091468 A1 | 3/2018 | Yong et al. |
| 2018/0144389 A1 | 5/2018 | Fredrich et al. |
| 2018/0152471 A1 | 5/2018 | Jakobsson |
| 2018/0219830 A1 | 8/2018 | O'Brien et al. |
| 2018/0329565 A1 | 11/2018 | Yeung et al. |
| 2018/0367484 A1 | 12/2018 | Rodriguez et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2020/0051120 A1 | 2/2020 | Senftleber et al. |

FOREIGN PATENT DOCUMENTS

| | | |
|---|---|---|
| WO | 2013158839 A1 | 10/2013 |
| WO | 2014089460 A2 | 6/2014 |
| WO | 2014165463 A3 | 1/2015 |
| WO | 2015013436 A2 | 1/2015 |
| WO | 2019075284 A2 | 4/2019 |

OTHER PUBLICATIONS

Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.

Ofori-Awuah, Maame, Final Office Action dated Sep. 6, 2019 for U.S. Appl. No. 14/929,209.

Rashid, Ishrat, Final Office Action for U.S. Appl. No. 15/782,653 dated Sep. 19, 2019.

Wang, Xiaoqing, and Shannon Lantzy. "A Systematic Examination of Member Turnover and Online Community Health." Thirty Second International Conference on Information Systems, Shanghai (2011), pp. 1-11.

"Craigslist Online Community." Craigslist.org. Jul. 6, 2010.

Ahmed, Saba, Final Office Action dated Jun. 29, 2016 for U.S. Appl. No. 14/098,492.

Ahmed, Saba, Non-Final Office Action dated Nov. 19, 2015 for U.S. Appl. No. 14/098,492.

Arentz et al., Classifying offensive sites based on image content [online], Computer Vision and Image Understanding 94, 295-310, 2004, Retrieved from the Internet.

Bista, Sanat Kumar et al., "Using Gamification in an Online Community," CSIRO ITC Centre, Conference Paper, 2012.

Blaufeld, Justin R., Final Office Action dated Mar. 24, 2016 for U.S. Appl. No. 14/098,501.

Blaufeld, Justin R., Non-Final Office Action dated Sep. 24, 2015 for U.S. Appl. No. 14/098,501.

Bostock, Mike, Sankey Diagram, available at http://bost.ocks.org/mike/sankey, published May 21, 2012, 1 pg.

(56) References Cited

OTHER PUBLICATIONS

Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Friedman et al., U.S. Appl. No. 61/650,849, filed May 23, 2012 and entitled, "Dynamic Information Streams in a Social Network Platform."
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Lithium Website, http://www.lithium.com, Dec. 11, 2010, retrieved from Internet Archive, pp. 1-9.
M2 PressWire, "Alterian: Social media monitoring and analytics comes of age with Alterian's acquisition of market leader Techrigy," Jul. 15, 2009, Anonymous, Norman Media Ltd, London.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Non-Final Office Action dated Jun. 11, 2019 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."

(56) References Cited

OTHER PUBLICATIONS

Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Spasojevic et al., U.S. Appl. No. 61/943,047, filed Feb. 21, 2014 and entitled, "Domain Generic Large Scale Topic Expertise & Interest Mining Across Multiple Online Social Networks."
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Thomas, Shane, Written Opinion of the International Searching Authority and International Search Report dated Aug. 16, 2013 for International Patent Application No. PCT/US2013/037107.
Vo, Huyen X., Non-Final Office Action dated Mar. 15, 2019 for U.S. Appl. No. 15/782,642.
Walsh, John B., Non-Final Office Action dated Mar. 24, 2017 for U.S. Appl. No. 14/702,696.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Dinh, Khanh Q., Notice of Allowance and Fee(s) Due dated Oct. 29, 2019 for U.S. Appl. No. 15/877,379.
Fiorillo, James N., Notice of Allowance and Fee(s) Due dated Nov. 14, 2019 for U.S. Appl. No. 15/821,543.
Meng, Jau Shya, Non-Final Office Action dated Jan. 3, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
U.S. Appl. No. 15/782,642, filed Oct. 12, 2017.
U.S. Appl. No. 15/782,635, filed Oct. 12, 2017.
U.S. Appl. No. 15/821,543, filed Nov. 22, 2017.
U.S. Appl. No. 15/877,381, filed Jan. 22, 2018.
U.S. Appl. No. 15/877,379, filed Jan. 22, 2018.
U.S. Appl. No. 16/158,167, filed Oct. 11, 2018.
U.S. Appl. No. 16/158,172, filed Oct. 11, 2018.
U.S. Appl. No. 16/194,126, filed Nov. 16, 2018.
U.S. Appl. No. 16/413,577, filed May 15, 2019.
U.S. Appl. No. 16/458,183, filed Jun. 30, 2019.
U.S. Appl. No. 16/820,697, filed Mar. 16, 2020.
U.S. Appl. No. 16/827,625, filed Mar. 23, 2020.
U.S. Appl. No. 15/782,653, filed Oct. 12, 2017.
U.S. Appl. No. 16/158,169, filed Oct. 11, 2018.

* cited by examiner

CONTINUOUS DATA SENSING OF FUNCTIONAL STATES OF NETWORKED COMPUTING DEVICES TO DETERMINE EFFICIENCY METRICS FOR SERVICING ELECTRONIC MESSAGES ASYNCHRONOUSLY

FIELD

Various embodiments relate generally to data science and data analysis, computer software and systems, and wired and wireless network communications to interface among repositories of disparate data and computing machine-based entities configured to access, track, and/or analyze the data, and, more specifically, to a computing and data storage platform to implement computerized tools to continuously (or nearly continuously) sense data describing functional states of remote computing devices and/or user interfaces configured to service electronic messages, according to at least some examples.

BACKGROUND

Advances in computing hardware and software have fueled exponential growth in a variety of communication channels with which organizations and entities, such as corporations (e.g., retailer sellers), may exchange information through any number of electronic messaging networks, including social media networks. Such entities aim to quickly and efficiently respond to messages from customers (and potential customers) to manage brand loyalty and reputation, and to bolster customer engagement. And since different customers prefer communicating over different communication channels, traditional customer-relationship management ("CRM") computing systems and processes are not well-suited for determining functional states of remote computing devices and/or user interfaces to determine granular metric data, such as agent productivity metrics.

For example, some computing devices and processes are limited to capturing data describing key performance metrics for synchronous modes of communication, such as a telephone network communications. Traditionally, call centers implement communication management and monitoring software that requires both a callee and caller to be available simultaneously to facilitate a vocal conversation. Such limitations (e.g., simultaneous two-way communication) are generally difficult to adapt to asynchronous electronic messaging, whereby an originator of an electronic message and its recipient need not actively be engaged simultaneously via a communication channel.

In some cases, conventional customer care systems and computerized processes have adapted call center techniques to track performance of receiving and sending electronic messages, such as emails. A drawback to these traditional systems is that performance tracking software applications typically resides at a remote client computing device as a local application. Local applications are generally updated less frequently and require resources (e.g., IT personnel) to maintain operability. Further, typical performance tracking software applications provide relatively coarse metrics, whereby data values are usually captured over a period of time until an activity is deemed completed. Since performance metrics are usually determined upon completion of an activity or an action, computer utilization and performance metrics are generally unavailable, delayed, or of insufficient quality to provide timely and accurate feedback to manage a workforce effectively. While traditional performance tracking software applications have sufficient functionality to provide historic or archival computer utilization and performance metrics, historic and archived data are not well-suited to provide instantaneous or "just-in-time" data for in-situ workforce management.

Also, monitoring amounts of time using known performance tracking software applications is generally coarse as well. So with time being captured with less precision, some actions or activities may not be detected, thereby causing "gaps" of time for which a conventional performance tracking software application may not account. For example, a metric, such as "occupancy," may represent percentage of time a computerized process (and associated agent) is actually performing communication or message-related activities. However, less precise tracking of time by a performance tracking software application may cause such metrics to be viewed as less reliable (or otherwise untrustworthy) when managing a workforce (e.g., by identifying a sufficient number of agents of various skillsets to service electronic messages during a work shift).

Thus, what is needed is a solution for facilitating techniques to optimize computer utilization and performance associated with servicing electronic messages, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
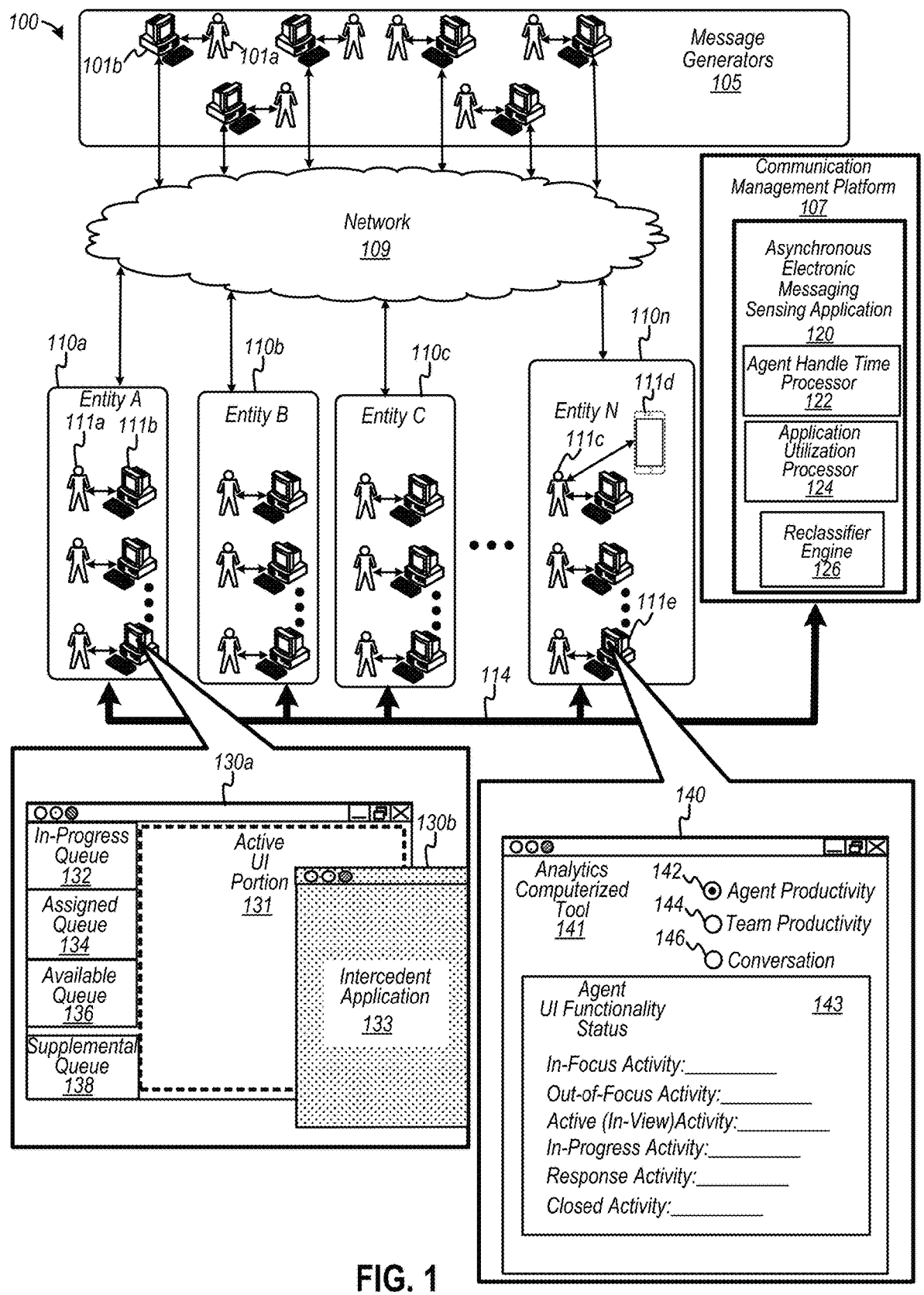
FIG. 1 is an example of a communication management platform configured to implement an asynchronous electronic messaging sensing application, according to some examples.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS").

Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., and others, without limitation or restriction.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others.

FIG. 1 is an example of a communication management platform configured to implement an asynchronous electronic messaging sensing application, according to some examples. Diagram 100 includes a communication management platform 107 configured to manage communications via network 109 between and among computing devices 101b and computing devices 111b and 111d with an aim to manage, improve, and optimize customer care and engagement to solidify and deepen brand loyalty, among other things. Each of computing devices 101b are shown to be associated with a user 101a, whereby users 101a in a pool of message generators 105 may be customers or potential customers of one or more organizations, such as any of entities ("A") 110a to ("N") 110n. An example of communication management platform 107 is Khoros Care Application and Platform developed and maintained by Khoros, LLC, of Austin, Tex., U.S.A. According to some examples, communication management platform 107 may be referred to as an application or a system, or any other element described in relation to the term "platform."

Asynchronous electronic messaging sensing application 120 may be configured to implement, monitor, and measure application utilization metric data and agent handle time metric data to identify and quantify functionalities of computing devices 111b and 111d to track productivity and efficiencies of such computing devices, which may be correlatable to tracking productivity and efficiencies of agents, such as agent-users 111a. Asynchronous electronic messaging sensing application 120 may be composed of hardware or software, or a combination thereof, and is configured to implement an agent handle time processor 122, an application utilization processor 124, and a reclassifier engine 126.

Agent handle time processor 122 may be configured to implement enhanced activity and/or action-based metrics that employ subsets of response time metric data as subclassifications of a response handle time. By subdividing the response time into subclasses of response time, a finer, more granular categorization of different types of response handle times may be monitored, measured, and analyzed. In one case, each of the subclasses of response time may be subdivided in time as a function of different roles or permissions of an agent. For example, agent handle time processor 122 may be configured to identify a role or permission for an agent (e.g., whether an agent is assigned a role requiring a response to be sent, whether an agent is assigned a role of an assistant agent, whether an agent is assigned a role to review and approve other agents' responses and work product, and/or whether an agent is assigned a role to provide expert assistance. The term "assistant agent" may be used to describe an agent performing one or more activities without executing an action, such as sending a response or closing a conversation, according to some examples. Also, agent handle time processor 122 (or reclassifier engine 126) may classify an agent's response time based on a role or permission. Further, agent handle time processor 122 may be configured to implement another subset of activity and/or action-based metrics that subdivides an amount of time for closing a conversation based on whether a response has been sent and based on whether an agent is responsible to close a conversation.

Application utilization processor 124 may be configured to implement enhanced application usage-based metrics associated with usage of communication management platform application 107. For example, application usage-based metrics may include application usage time metric data (or subsets thereof) to identify sub-classifications of application utilization (e.g., utilization of communication management platform application 107). For example, agent computing devices may be classified or detected as having one or more windows or tabs (e.g., one or more browser windows) either in an "in-focus" or an "out-of-focus" state. An agent computing device may have multiple windows "in-focus" state or "out-of-focus" states simultaneously in one non-limiting example. Note that the states of being "in-focus" or "out-of-focus" are described below. Also, application utilization processor 124 may be configured to implement application usage-based metrics to determine whether an agent computing device has one or more active or inactive instances associated with agent activity time, and whether an agent computing device is accruing idle time.

According to various embodiments, communication management platform 107 and/or asynchronous electronic messaging sensing application 120 may be configured to implement a data stream throughput pipe 114 that provides scalable data throughput and real-time (or near real-time) data delivery rates from ingest into the data pipe to a storage device. The storage device may also be configured to respond to data queries in real-time (or near real-time) to provide immediate real-time agent performance optimization and integration with workforce planning and management tools. Note that data stream throughput pipe 114 may be implemented in network 109, at least in some cases, and data stream throughput pipe 114 may be configured to scale data throughput from megabytes to terabytes per hour. Also, with increased rates of data collection by, for example, application 120, some monitored data may not be readily classifiable. As such, some subsets of collected data from agent computing devices 111a and 111c in various entities 110a to 110n may be identified as "in-progress" data. Upon detecting an action (e.g., a response has been sent) associated with a subset of "in-progress" activity data, reclassifier engine 126 may be configured to reclassify "in-progress" activity-related data into, for example, response handle time data, and in some cases, with more granularity (e.g., based on a role as described above).

Figure 3:
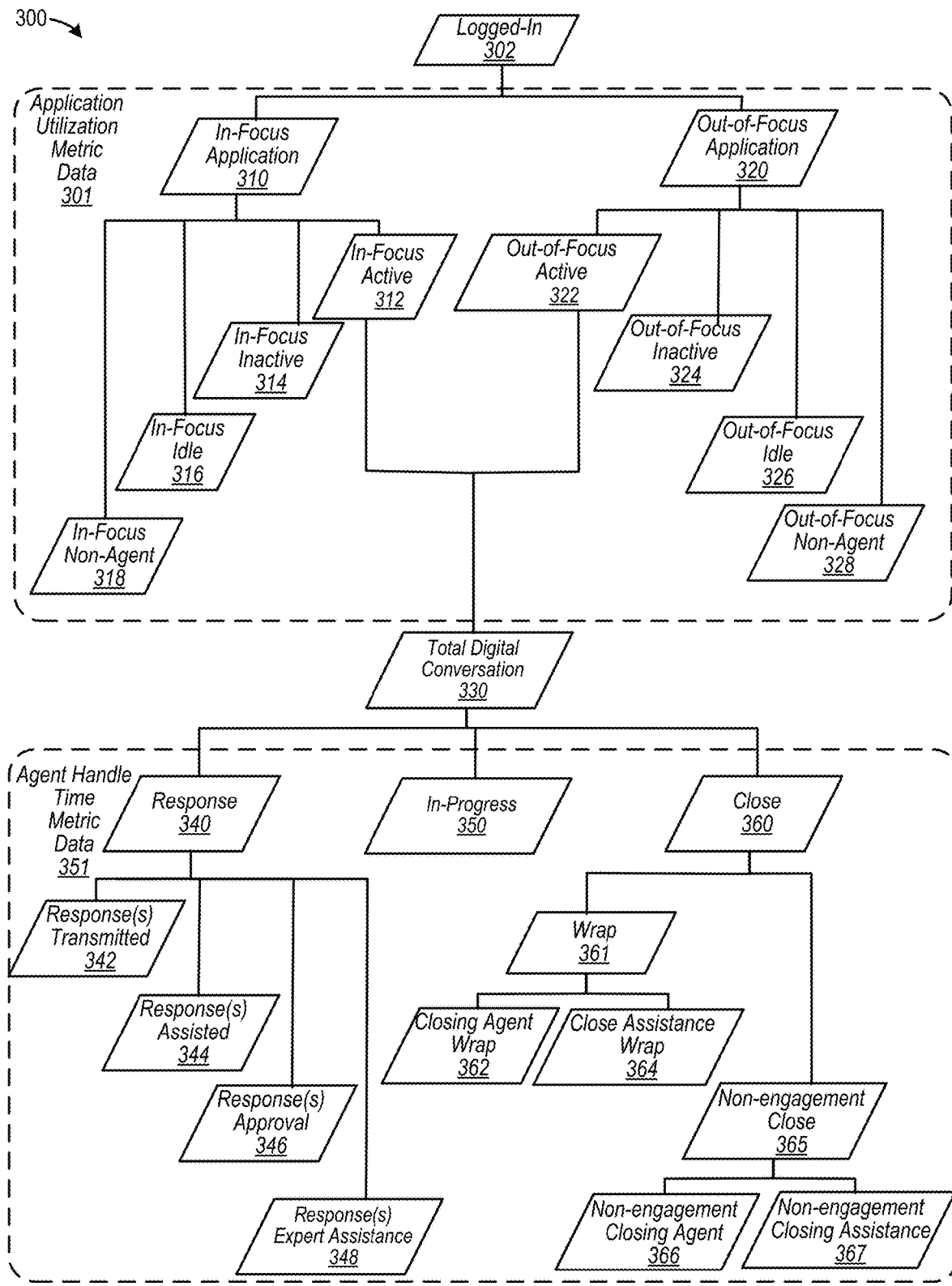
FIG. 3 depicts an example of data types including data representing metrics as determined by an asynchronous electronic messaging sensing application, according to some examples.

In view of the foregoing, asynchronous electronic messaging sensing application 120 can be configured to capture metric data based on slices of time (i.e., segments of time) rather than capturing, for example, action-triggered events (e.g., capturing data when a response is sent, a conversation is closed, or another event). Further, combined functionality of agent handle time processor 122 and application utilization processor 124 may be used to construct sophisticated and targeted metrics that may be based on a combination of agent handle time metric data and application utilization metric data. For example, a "conversation handle time" metric (or "total conversation" handle time) for an agent may include identifiable subsets of time related to responding, assisting, or closing conversations, and can also include identifiable subsets of time related to "in-focus" application utilization and "out-of-focus" application utilization of communication management platform 107. According to some examples, data representing metrics for a conversation may include data values representative of various attributes of a conversation. For example, data representing a conversation may be analyzed to identify or characterize its attributes, such as whether an application (e.g., a UI application or a platform application, or a combination thereof) is either an "in-focus" or "out-of-focus" state (and values representing amounts of time in such states). Thus, data representing a conversation may be analyzed to identify or characterize its attributes relating to states and/or values representative of "application utilization metric data." Further, data representing a conversation may be analyzed to identify or characterize its attributes, such as whether an application is associated with one or more activities (e.g., activity types) or actions indicative of "agent handle time metric data." Examples of attributes relating to "agent handle time metric data" may also include data representative of sub-classifications of agent handle time metric data, such as an application in a "response" state (and associated time), a "close" state (and associated time), or other states (and associated time), such as a state in which data received may be associated with an unclassified state (e.g., data is associated with an 'in-progress' state) and associated time. In some embodiments, a metric including data representing various attributes of a conversation may be configured to determine performance of an agent computing device and/or an associated agent-user by monitoring and analyzing data related to a combination of application utilization and agent handle time activities, as well as subtypes or sub-classifications of each to provide an increased granular view of data representing sub-usages of an application and/or sub-activities associated with generating a response or closing a conversation. FIG. 3 provides examples of data with attributes may be associated for determining performance-related metrics, such as whether an activity or action as well as usage of an application may be associated over multiple periods of time, over one or more agents, over one or more communication channels, over one or more different activity types, over one or more different actions, and the like.

Figure 8A:
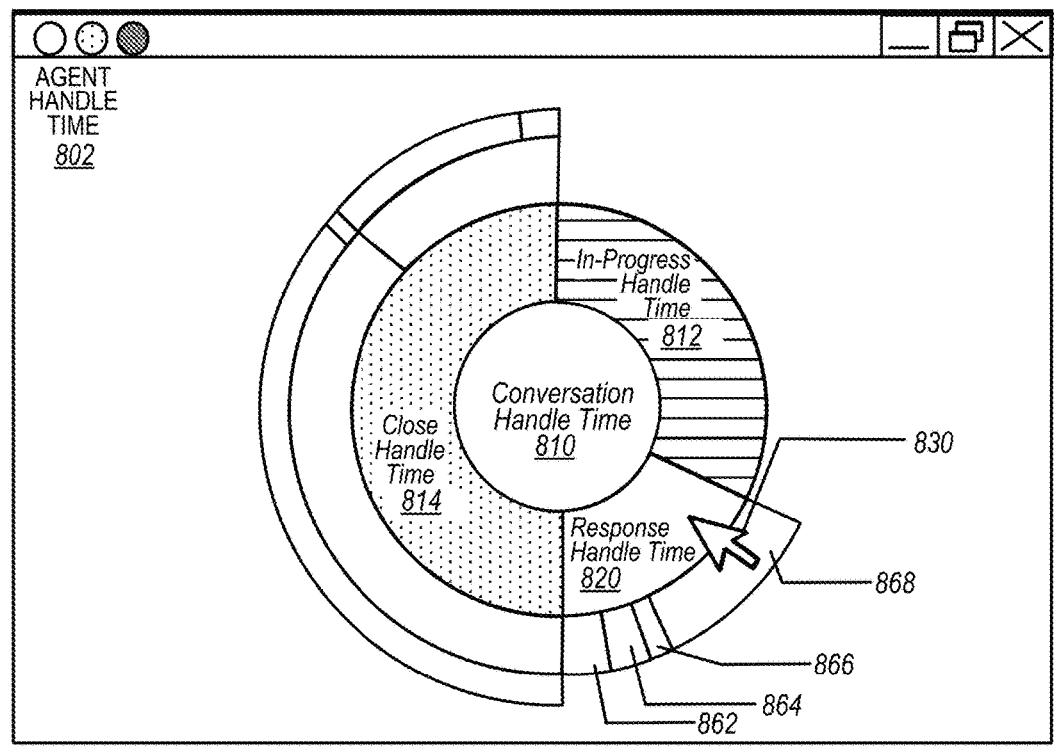
FIGS. 8A and 8B are examples of user interfaces configured to generate and present granular subsets of metric data to present a state of an agent computing device in real-time or nearly in real-time, according to some examples.
Figure 8B:
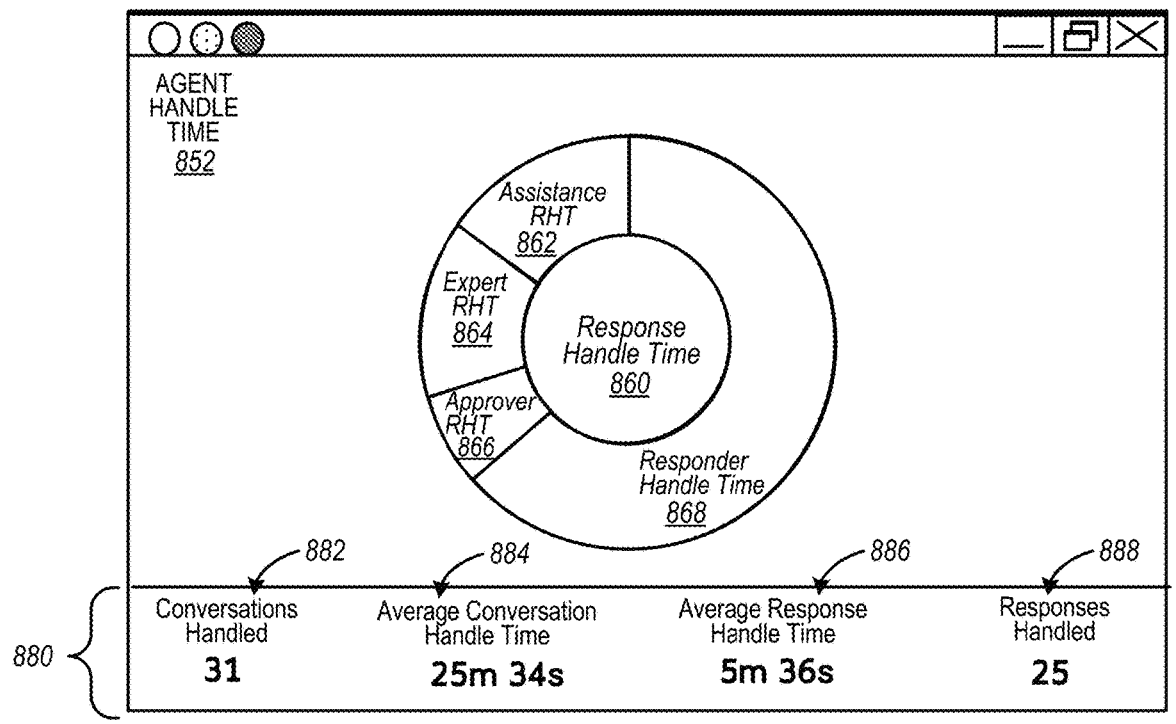

In further view of the foregoing, data exchanges between an asynchronous electronic messaging sensing application 120 and data derived at a user interface that represents a state associated with the user interface is analogous to a processor configured to sense data (e.g., raw data) generated or otherwise derived by a sensor, such as a remote sensor, for determining a state of a particular object or thing to which a sensor is applied. In some examples, asynchronous electronic messaging sensing application 120 can be configured to configure operation of a browser (e.g., at an agent computing device) so as to function as a "sensor" that may be configured to determine "sensed data" as one or more states of an agent computing device, one or more states of a user interface portion, and/or one or more states of interactions by an agent-user with electronic messages of a conversation. Thus, by configuring a browser application (or any other executable code) as a sensor placed or located at a remote computing device (e.g., an agent computing device), more enhanced determinations of one or more states may be calculated with enhanced accuracies based on, for example, more granular classifications and sub-classifications of data that may be sensed at a remote agent computing device. The granular classifications of data may assist in monitoring various attributes of an agent's interaction via a user interface to service electronic messages in accordance with a set of rules representing, for example, thresholds based on productivity goals, key performance indicators, or the like. Therefore, productivity of an agent computing device or user interface, which may be correlatable to the productivity of an agent-user, may be monitored in real-time or near real-time for purposes of providing feedback to correct any performance deficiencies nearly instantaneously (e.g., automatically via a computing system or manually). Moreover, asynchronous electronic messaging sensing application 120 may be configured to sense data from one or more agent computing devices at each segment of time, which may be fast enough to provide, for example, instantaneous or "just-in-time" metric data for in-situ workforce management (e.g., by using sensed data being received at segments or intervals of 30 seconds, or less, up to 5 minutes, or more). As such, data captured at each segment of time may provide increased accuracy of an agent's performance or productivity in real-time (or near real-time). According to some examples, an application or process described herein may be configured to generate data configured to present or display a specialized representation of one or more levels of classification of data representing application utilization metric data and/or data representing agent handle time metric data, an example of which is depicted in FIGS. 8A and 8B.

An example of a user interface 130a is shown to include in-progress queue 132, an assigned queue 134, an available queue 136, and a supplemental queue 138. User interface 130a may be generated by (or in association with) communication management platform 107, and is depicted as including an active UI portion 131. When agent-user 111a works on a conversation in the electronic workspace associated with active UI portion 131, then the application (e.g., application 107) is in an "active" state. But as shown in diagram 100, a conversation is not disposed in active UI portion 131 (i.e., a conversation is not being "worked on"). Therefore, the application is an "inactive" state. In-progress queue 132 may include data for presenting conversations that have been acted upon (e.g., an agent has begun preparing a draft response, but has put it on hold temporarily). Assigned queue 134 may be configured to include data for presenting conversations assigned to a specific agent-user 111a, and available queue 136 includes conversations for which any agent-user 111a (e.g., in a common organization or entity) can prepare a response. Supplemental queue 138 may include other queues as described herein, such as a "needs approval" queue and/or a "needs expert assistance" queue. If an agent has permission to do so, the agent (e.g., as agent-user 111a) may perform work on conversations in those queues. But if no conversations are in any queues, and active UI portion 131 is empty (e.g., no conversation is being accessed), then the application (e.g., application 107) is an "idle" state. Next consider that a communication management platform application 107 has been opened and accessed as the latest application. In this case, the application is in an "in-focus" state. But if a subsequent and/or different application is opened, such as an intercedent application 133 in user interface or window 130b, then the communication management platform application 107 may be in an "out-of-focus" state.

Further to diagram 100, an agent computing device 111e may be configured to implement an analytics computerized tool 141 in a user interface 140. As shown, user inputs 142, 144, and 146 may be selected to generate productivity metric data for a single agent, a team of agents, and a conversation, respectively. In some examples, an agent UI functionality status 143 may be presented to show a number of metrics with associated values be shown in the blanks (values not shown). In some examples, asynchronous electronic messaging sensing application 120 may include logic and/or software to implement analytics computerized tool 141.

According to one example, agent-user 111c may be authorized to provide log-in credentials to use both mobile computing device 111d and a desktop 111b to access a conversation on either device to provide a response or take any other action.

Figure 2A:
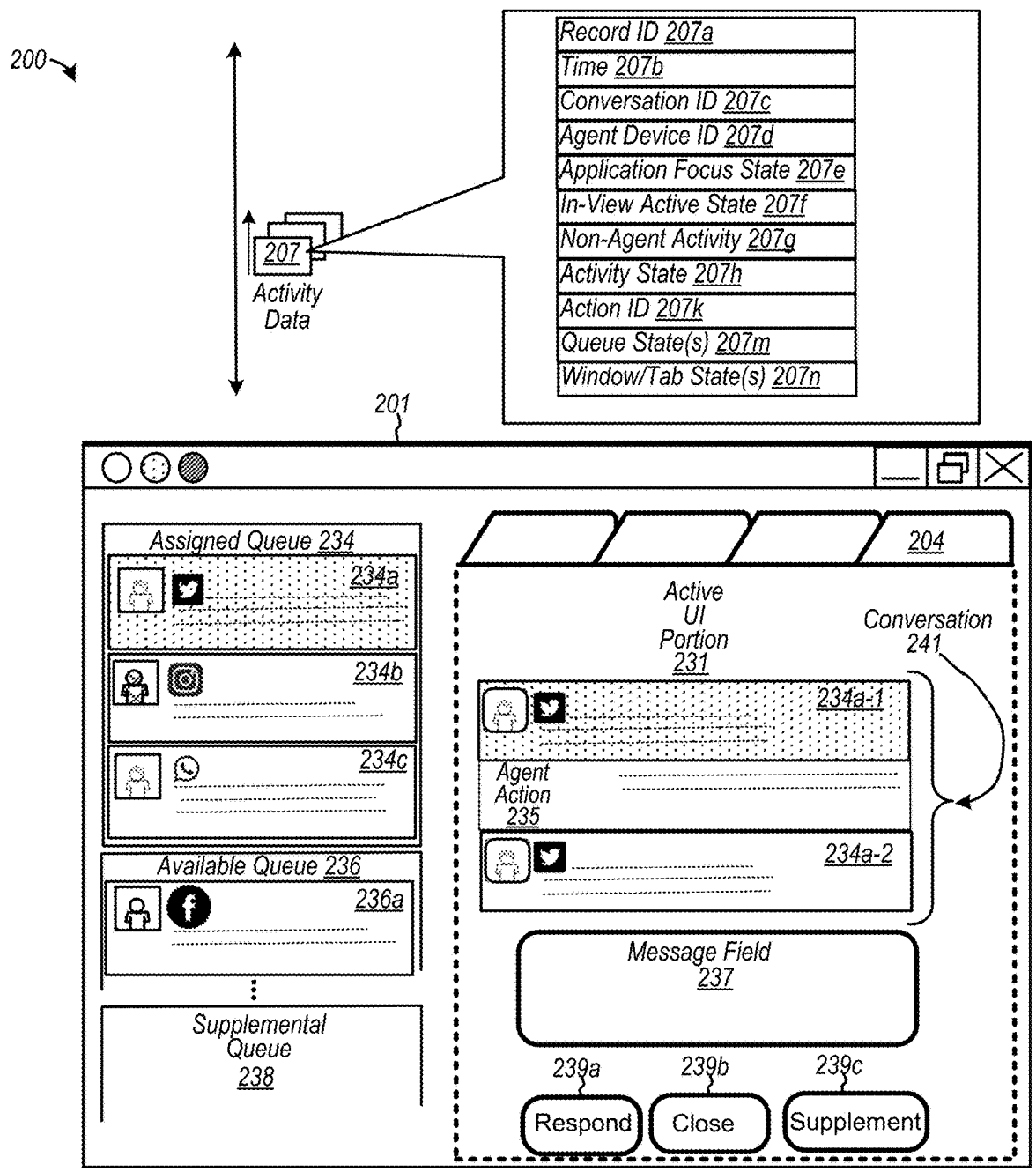
FIG. 2A is a diagram depicting a user interface of an agent computing device from which state data is captured and transmitted to an asynchronous electronic messaging sensing application, according to some examples.

FIG. 2A is a diagram depicting a user interface of an agent computing device from which state data is captured and transmitted to an asynchronous electronic messaging sensing application, according to some examples. Diagram 200 of FIG. 2A depicts a user interface 201 configured to provide an agent-user with a computerized tool to service electronic messages with an aim toward managing customer care and engagement. In at least one example, computerized tools may be in the form of user inputs and other interactive selections. One or more computerized tools of an asynchronous electronic messaging sensing application are configured to facilitate analysis of data 207, which may be continuously (or nearly continuously) sensed or monitored to determine and characterize various functional states of an agent computing device (e.g., via user interface 201) when performing various actions and activities to service electronic messages.

Diagram 200 shows an example of a user interface 201 including a number of queues that may include conversations requiring resolution. An assigned queue 234 includes electronic messages and/or conversations 234a, 234b, and 234c that are assigned specifically to an agent computing device into which a specific agent (e.g., agent-user) is logged for generating a response. Available queue 236 includes conversations 236a that are available to any agent upon which to act. Supplemental queue 238 represents one or more additional queues that may include conversations that require supplemental activity or action, such as "needing approval" or "needing expert assistance," or requiring other supplemental processing (not shown). Whether such conversations appear in supplemental queue 238 may depend on whether an agent has permissions or a role authorized to process conversations in those specialized queues.

In this example, user interface 201 depicts a number of tabbed windows as an example of multiple windows that may be implemented to access a number of conversations, each being associated with one of the tabbed windows. Here, tabbed window 204 is shown to include an active user interface portion 231 that, when activated to include a conversation, such as conversation 241, causes the application to be identified as being in an "active" state. Conversation 241 includes two (2) messages 234a-1 and 234a-2 from an originating user, such as a customer, and also includes a prior agent action 235, which may have been a prior response by another agent.

With tabbed window 204 being in an active state, computerized tools associated with user interface 201 may be activated to perform an action. Examples of such tools include message field 237 (into which response text may be entered), respond activation input 239a to send a response, close conversation activation input 239b to close a conversation, and supplement activation input 239c to provide supplemental functionality. In various examples, supplement activation input 239c may be configured to initiate approval, if conversation 241 is retrieved from a "need approval" queue. Or, input 239c may be configured to activate an action to cause expert assistance to be rendered, if conversation 241 is retrieved from "need expert assistance" queue.

The states of a communication management platform application associated with one or more tabbed windows 204 may be determined relative to various functional states of user interface 201 and portions thereof (e.g., including active UI portion 231). Also, the various functional states may be transmitted as activity data 207 for various segments of time. In one example, activity data 207 may be transmitted as a record at various intervals of time, such as once every 30 seconds (or less) or up to once every 5 minutes (or more). Further to the example shown, a record of activity data 207 may include (1) data representing a record identifier ("ID") 207a to uniquely identify data transmitted at a point in time, (2) data representing one or more points of time 207b (e.g., constituting a duration), (3) data representing a conversation identifier ("ID") 207c (e.g., to identify an active conversation) to which activity data 207 belongs, and (4) data representing one or more agent identifiers ("ID") 207d associated with one or more computing devices that may operate in combination to perform a response.

A record of activity data 207 may also include (5) data representing an application focus state 207e (e.g., whether an application is "in-focus"), (6) data representing a state 207f indicative of whether a conversation is in an "in view" active state (e.g., conversation 241 is "in view" within active UI portion 231), (7) data representing a detected non-agent activity 207g (e.g., an agent is using an analytics application or is implementing other non-agent functionality of a communications management platform application), and (8) data representing an activity state 207h that may be unclassified, or otherwise may be classified as "in-progress" time. Activity data 207 may include (9) data representing an action identifier ("ID") 207k that specifies a state or type of an action that has been activated or implemented (e.g., a response was sent) for reclassifying in-progress time to "response time." In addition, (10) data representing the state of one or more queues ("queue state(s)") 207m may be included to determine, for example, an idle time when no conversations are in queues 234, 236, and 238 and when no conversation is active in a tabbed window, such as tabbed window 204. Also, (11) data representing states of one or more windows or tabs 207n may be captured and monitored to determine application states and active states of each of the windows to determine, for example, application utilization metric data.

Note that the format of a record of activity data 207 and the types of data collected shown in diagram 200 are merely exemplary and are not intended to be limiting. Thus, activity data 207 may include data arranged in any data structure and any type of data may be included in activity data 207 to monitor and generate application utilization metric data and agent handle time metric data, as well as other metric data. Note, too, that any of the states and values of data 207 may be associated with a timer (e.g., JavaScript timers) to track changes in states and values relative to time. A timer may record a length of time over which a state or value remains, for example, unchanged.

Figure 2B:
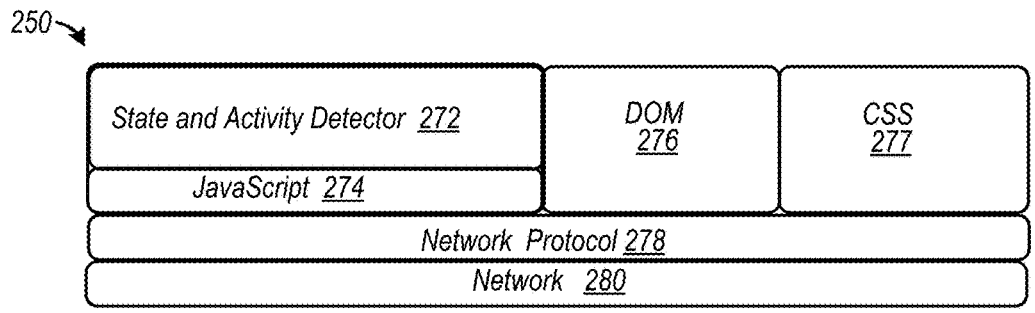
FIG. 2B is a diagram depicting an example of a browser application stack configured to determine a state of functionality of an application, such as depicted in user interface 201 of FIG. 2A, according to some examples.

FIG. 2B is a diagram depicting an example of a browser application stack configured to determine a state of functionality of an application, such as depicted in user interface 201 of FIG. 2A, according to some examples. A network protocol 278, such as HTTP (or the like), may be layered upon a network layer 280, which may include IP-based networks and protocols or any other type of network. Further, browser application 250 is shown to include a JavaScript engine 274, a document object model ("DOM") 276, and a cascading style sheet ("CSS") language 277, as an example. A state and activity detector 272 may be implemented within or on top of JavaScript engine 274, and may be implemented in JavaScript as passed from an asynchronous electronic messaging sensing application. In some examples, state and activity detector 272 may be configured to provide, among other things, JavaScript timer functionality as well as data capture and transmission to an asynchronous electronic messaging sensing application.

FIG. 3 depicts an example of data types including data representing metrics as determined by an asynchronous electronic messaging sensing application, according to some examples. As shown, diagram 300 includes data 302 representing a time that a computing device is logged into a communication management platform application via, for example, a browser application associated with a user interface. In particular, data 302 may include an amount of time (e.g., a total amount of time) an agent computing device has an active session communicatively coupled via a network between one or more browser windows (or tabs) and a communication management platform. The one or more browser windows or tabs may be associated with a specific agent computing device, or the one or more browser windows may be distributed over multiple computing devices, including, but not limited to a desktop workstation, a laptop, a tablet computing device (e.g., iPad®), a mobile computing device, such as a mobile phone, and the like. An amount of time determined as logged-in time data 302 may be used for generating one or more metrics (e.g., a percentage of logged-in time relative to an amount of scheduled shift time, such as eight (8) hours, or for any other selectable period of time). In at least some examples, logged-in data 302 may include aggregated data over multiple agent computing devices and agents (e.g., each agent having a unique identifier). Thus, logged-in data 302 may include a total amount of logged-in time by adding each amount of logged-in time for each agent-user in a group or "team" of agents.

Data types in diagram 300 includes a combination of application utilization metric data 301 and agent handled time metric data 351 derived, generated, and/or acquired by an application utilization processor and an agent handled time processor, respectively, as described herein. Application utilization metric data 301 includes data representing various states of application usage (i.e., data indicative of usage or non-usage of a communication management platform to manage electronic message communications aimed at enhancing customer care and engagement). By contrast, agent handled time metric data 351 may include data representing amounts of time for various states or types of activity and/or various states or types of actions.

In-focus application data 310 is depicted as being further classified into sub-types that include in-focus active data 312, in-focus inactive data 314, in-focus idle data 316, and in-focus non-agent activity data 318, each of which includes one or more amounts of time associated with a particular application usage state. In some examples, in-focus application data 310 may be hierarchical, and sub-types of data 312, 314, 316, and 318 may be mutually exclusive (e.g., for a point in time). In-focus application data 310 may be indicative of an amount of time that an agent computing device is implementing at least one window (or tab), such as a browser window, of a communication management platform application during a selected period of time. Correspondingly, in-focus application data 310 may also be indicative of an amount of time an associated agent-user is interacting with (or is focused on) a certain window or tab. According to some embodiments, the term "in-focus" can refer, in at least one example, to an application usage state in which a window (or tab) is opened and focused, responsive to receiving a user input configured to select the window for performing an activity. In some cases, an application may be "in-focus" when it is viewable or visible in at least a portion of a user interface. Further, an application may be identified as being in an "in-focus" state if a processor of a computing device has executed instructions for the in-focus application most recently (e.g., relative to other applications). An application may also be identified as being in an "in-focus" state if a processor has operated on instructions associated with a most recently received user input from a portion of a user interface (e.g., an active UI portion) through which an agent-user may be performing an activity related to a digital conversation. Or, an application may be identified as being in an "in-focus" state if a processor has operated on instructions with a most recently presented user output in a portion of a user interface.

In-Focus metric data may provide information regarding the amounts of time during which one or more agents-users are interacting with a communication management platform application as the focused application on a desktop or mobile computing device (e.g., a window displaying access to a communication management platform application may be "in-focus" if it is the most recent or last application with which an agent has interacted). Note that an amount of time associated with in-focus application data 310 may be equivalent or approximately equal to a sum of each amount of time associated with each of in-focus active data 312, in-focus inactive data 314, in-focus idle data 316, and in-focus non-agent activity data 318. In some cases, an amount of time associated with in-focus application data 310 may be less than an amount of time associated with logged-in data 302.

In-focus active data 312 may include an amount of time that an agent computing device is presenting an electronic message of a digital conversation to an active user interface ("UI") portion. Thus, at least in some cases, a portion of the digital conversation that is actively "in view" within an application in an "in-focus" state may be associated with an amount of time included within in-focus active time data 312. An agent-user may interact via an electronic user input as a computerized tool (in an active UI portion), the user input being configured to cause execution of instructions to perform an activity (e.g., generating a response to a message, closing a digital conversation, etc.).

By contrast, in-focus inactive data 314 may be a classification or a subset (or sub-classification) of in-focus application data 310 that describes an amount of time during which "no" digital conversation is open or active, and one or more conversations are available in one or more queues to perform an activity. In particular, a window may present a communication management platform application to an agent-user, but active user interface ("UI") portion may be inactive. For example, an application may be in an inactive state if an electronic workspace implemented in a user interface does not present or display a conversation with which an agent-user may interact to perform an activity.

Digital conversations may be presented in one or more queues, depending on permissions and roles enabled at an agent computing device when an agent-user logs in. For example, an "available" queue may include conversations from which an agent-user in an "agent" role may select to engage, and an "assigned" queue may include conversations from which an agent-user (or "agent") has been assigned to engage. As another example, a supplemental queue (e.g., including a "needs approval" queue) may include conversations from which an agent-user in an "approver" role may select to engage in an active UI portion. In yet another example, a supplemental queue (e.g., including a "needs assistance" queue) may include conversations from which an agent-user in an "expert" role may select to perform an activity in an active UI portion. An agent-user may be assigned in any of the above-described roles (or any other roles), and therefore, may have conversations to act upon in a variety of queues.

In-focus idle data 316 may be a classification or a subset of in-focus application data 310 that describes an amount of time during which "no" digital conversation is open or active (i.e., no digital conversation is being interacted with in an active UI portion), and "no" conversations are available to an agent-user in any queues to perform an activity. That is, an agent computing device is presenting or displaying one or more empty queues (e.g., an "assigned" queue is empty, an "available" queue is empty, a "needs approval" queue is empty, and a "needs assistance" queue is empty). Access to queues of different categories of actions may be defined by an agent-user's roles and permissions, examples of which are described above.

In-focus non-agent activity data 318 may be a classification or a subset of in-focus application data 310 that describes an amount of time a user interacts with a communication management platform application to perform non-agent functionality. For example, a user may select a window or tab that is configured to perform a management function, an analytics operation, a supervisorial function, or an administrator operation in the application.

Out-of-focus application data 320 of diagram 300 is depicted as being further classified into sub-types that include out-of-focus active data 322, out-of-focus inactive data 324, out-of-focus idle data 326, and out-of-focus non-agent activity data 328, each of which includes one or more amounts of time associated with a state in which a particular application is not being used. Out-of-focus application data 320 may be indicative of an amount of time that an agent computing device is implementing either "another" window (or tab) of a communication management platform application or "any other application" during a selected period of time. Additionally, out-of-focus application data 320 may also be indicative of an amount of time an associated agent-user is interacting with (or is focused on) any "other" window or tab subsequent to interacting or focusing on one or more previous "in-focus" applications. According to some embodiments, the term "out-of-focus" can refer, in at least one example, to an application usage state associated with a first window (or tab) that is opened and focused upon at a first point in time, with a second window (or tab) being subsequently activated as an "in-focus" application. The second window may be associated with the same application (e.g., a communication management platform application) or a different application to perform a different functionality (e.g., an application directed to functionality provided by a website for a shipping company so an agent-user may verify shipment of a product via shipment tracking number). In this example, the application in the first window is in an "out-of-focus" state.

In some cases, any number of "other" applications may be performed or executed in background windows and tabs, each of the other applications being considered "out-of-focus" (e.g., a most recently-opened window may be activated as the focus of the functionality performed at an agent computing device, thereby causing previously multiple executed applications to be identified as "out-of-focus" states). Applications in "out-of-focus" states need not accrue "in-focus" time while opened. Thus, a communication management platform application may be opened or accessed in multiple windows (or tabs) using a common browser, with the most recently focused (e.g., "clicked-on" or selected window) being tracked as "in-focus" time.

In some cases, "out-of-focus" time metrics need not be hierarchical as multiple windows may be open and out-of-focus (e.g., simultaneously or nearly simultaneously, or instances in which two or more windows may overlap in time). Thus, out-of-focus time may include an aggregation of multiple out-of-focus times, which may exceed a total logged-in time data 302, according to at least one example. In one implementation, an amount of time associated with out-of-focus application data 320 may be equivalent or approximately equal to a sum of each amount of time associated with each of out-of-focus active data 322, out-of-focus inactive data 324, out-of-focus idle data 326, and out-of-focus non-agent activity data 328. Note that the following classifications of out-of-focus active data 322, out-of-focus inactive data 324, out-of-focus idle data 326, and out-of-focus non-agent activity data 328 are determined or described to include amounts of time similar or equivalent to in-focus active data 312, in-focus inactive data 314, in-focus idle data 316, and in-focus non-agent activity data 318, respectively, but the former (e.g., data 322 to 328) is associated with non-utilized application states (i.e., a window or application is in an out-of-focus state).

In-focus inactive time data 314 and out-of-focus inactive time data 324 can be used to help to identify agent computing devices (and associated agent-users) that are operating optimally. When an agent has in-focus inactive time data 314, an agent computing device may not be processing a conversation in an active UI portion even though conversations are available in a queue. For example, if an agent closes or dismisses a conversation from view and then waits five (5) minutes before selecting a next conversation, the agent may accrue five (5) min of inactive time rather than active time. This time may be classified as either as in-focus inactive time data 314 or out-of-focus inactive time data 324, depending on whether a communication management platform application is "in-focus" or "out-of-focus" (or whether a different application may be executing on an agent computing device during this time). One reason an agent might accrue out-of-focus inactive time data 324 is that the agent may artificially reduce their response handle times associated with subsets of response handle time data 340 (e.g., sub-types of data 342 to 348) by dismissing conversations from an active UI portion (or view) and resorting to drafting responses outside of the communication management platform application.

Idle time data 316 and 326 may be tracked under similar circumstances as inactive time data 314 and 324. Amounts of idle time may indicate that an agent does not have any conversations available to work on. Also, spikes or relatively sharp increases in the rates of detected idle time over a group of agents may be indicative that too many agents are working during periods of low volume, or, alternatively, that a workflow ought to be evaluated for optimal performance.

Further to diagram 300, agent handle time metric data 351 is shown to include granular sub-classifications of agent activity data including response data 340 (e.g., "total" response data), in-progress data 350 (e.g., "total" in-progress data), and close data ("total" close data) 360, any of which may represent a "total" amount of data or any portion thereof. Response data 340 may be a summary metric that may aggregate (e.g., "roll up") any amount of time an agent computing device may be operating to present a conversation via an active UI portion before a response has been sent or other activities are performed. Also, response data 340 can correlate to an amount of time that an agent-user spends on viewing or interacting with a conversation in an active UI portion. Examples of activities in which time may be aggregated to represent response time data 340 include (1) amounts of time one or more agents spend responding and providing assistance (without sending a response), such as adding a tag, routing an electronic message of a digital conversation to a different queue or agent computing device, (2) amounts of time one or more agents spend approving a response or other agent activity, (3) amounts of time one or more agents spend providing expert assistance to "facilitate a response" or to "facilitate a resolution," among other things. Thus, a total amount of time associated with response data 340 may be a sum of amounts of time associated with response(s) transmitted data 342, response(s) assisted data 344, response(s) approval data 346, and response(s) with expert assistance data 348.

Note that amounts of time described in agent handle time metric data 351 may refer to an amount of time (e.g., an average amount of time) between receiving an electronic message (e.g., a start time of a digital conversation) and a point of time at which an agent activity or action is performed (e.g., sending a response), according to some examples. Thus, a total handle time may be a total amount of time an agent spends viewing conversations, including during approval, that were subsequently either responded to or closed during a selected time period. Note, too, that amounts of time associated with response(s) transmitted data 342, response(s) assisted data 344, response(s) approval data 346, and response(s) with expert assistance data 348 may be hierarchical and mutually exclusive. Also, handle time ("HT") may continue to accrue whenever a digital conversation is in view by an agent-user (e.g., in an active UI portion), regardless of whether a browser window (or tab) is "in-focus." Therefore, amounts of time associated with data 342, 344, 346, and 348 can be aggregated to account for activities performed by each agent that has performed an activity through interactions with a digital conversation.

Response(s) transmitted data 342 may include data representing a response handle time that may be indicative of an amount of time that an agent computing device operates, responsive to input via a user interface, upon a conversation prior to transmitting a response. Subsequently, the agent performs an action (e.g., sending a response) that may cause unclassified data (e.g., in-progress data 350) to be reclassified as "response data." If an agent computing device does not initiate transmission of a response, then time need not accrue under this classification (or sub-classification) of time. Other amounts of time associated that are associated with supplemental agent activities (i.e., non-response activities) include response(s) assisted data 344, response(s) approval data 346, and response(s) with expert assistance data 348, any of which may be performed by an agent that need not transmit or provide a response.

Response(s) assisted data 344 may include data representing a response assisted handle time that may be indicative of an amount of time that an agent computing device functions to provide assistance to facilitating formation of a response rather than directly or actively transmitting a response, approving a response, or providing expert help. For example, response(s) assisted data 344 may include amounts of time associated with agent activities that may include adding notes to a digital conversation, tagging the conversation, routing the conversation, or assigning an electronic message to route a conversation into a queue accessible by a specific agent-user. Thus, an agent may perform assistance as an activity (e.g., as a "response assistant") if the agent does not transmit the response, but rather performs some work on it.

Response(s) approval data 346 may include data representing a response approval handle time that may be indicative of an amount of time that an agent computing device operates to provide approval functionality to approve a response to be sent (e.g., by another agent). This time may be an amount of time that an agent in an "approver" role spends viewing or interacting with a conversation prior to taking a response approval action, which may by any action in furtherance of approving a response including approving the response. Approval time may include amounts of time for editing a response, approving a response, rejecting a response, and other like activities or actions. Note that an Approver's time spent viewing an approval request where the response was rejected and no subsequent approved response was sent may nonetheless accrue as response approval handle time in favor of the agent who performed an approval action. In some cases, the approving agent may perform a response action (e.g., send an approved response) or perform a close action (e.g., approves closure of a conversation).

Response(s) with expert assistance data 348 may include data representing an expert help response handle time that may be indicative of an amount of time that an agent computing device functions to provide specialized assistance for facilitating a response to be sent (e.g., by another agent). This time may be an amount of time that an agent in an "expert" role spends viewing or interacting with a conversation prior to supplementing a response with additional, specialized information as an expert. Expert assistance time includes amounts of time spent reviewing a request for assistance, as well as supplementing a response before the response is transmitted (e.g., by another agent). In some cases, the expert agent may perform a response action (e.g., send the response with specialized information) or other actions.

Regarding activities associated with closing a conversation, close data 360 may include data representing close handle time metrics that are indicative of an amount of time that one or more agent computing devices (and associated agent-users) are executing instructions to close digital conversations. Close data 360 is shown as being divided (or sub-classified) into two "buckets," and may be defined as an amount of time spent on a conversation between a last response and an action as a close event. In particular, close data 360 may include wrap data 361 (e.g., "total" wrap data) and non-engagement close data 365 (e.g., non-engagement "total" close data).

Wrap data 361 may include amounts of time spent wrapping up a conversation, whereby the term "wrap" may describe activities leading to, and including, an action of closing a conversation with which one or more agent-users either engaged (and/or responded). In some examples, wrap data 361 may include amounts of time for conversations in which an agent computing device interacted (e.g., an agent handled a conversation) prior to closure of a conversation. Hence, wrap data 361 may refer to an amount of time to close one or more conversations that have been engaged (or responded to), whereby wrap time 361 may be a sum of amounts of time associated with closing agent wrap data 362 and close assistance wrap data 364.

Closing agent wrap data 362, which may be referred to as closing agent wrap handle time, may include data representing an amount of time an agent computing device may be operating to perform activities to close a digital conversation between a response and generation of a close action. An agent-user does not accrue time under this some classification if the agent-user assists in performing an agent-related activity and does not cause or perform an action of "closing" the digital conversation. Close assistance wrap data 364, which may be referred to as closing assistant wrap handle time (e.g., activities performed by "another" handler or agent), may include data representing an amount of time an agent computing device operates on a conversation (e.g., in an active UI portion) between a response and a closing event, whereby the agent computing device does not execute instructions to generate an action to close a conversation (i.e., an agent-user assists in closing an engaged conversation, but does not perform an action to close the conversation). The time an agent has spent assisting on wrapping a conversation may include, for example, tagging, adding internal notes, and the like.

Non-engagement total close data 365 may include time spent by one or more agent computing devices to close a conversation, whereby no response or communication has been generated for a received electronic message. For example, a customer or potential customer generates an electronic message requesting information and that electronic message forms part of a conversation. However, no response or any communication may exist to engage the originator of that electronic message. Thus, an "unengaged" conversation may include a received electronic message without engagement (e.g., without a response). In some cases, a conversation without a response may be referred to as a "responseless" conversation. Non-engagement close data 365 may include data representing a "total" close handle time indicative of an amount of time that one or more agent computing devices (and associated agent-users) execute instructions to close digital conversations without engagement. Thus, non-engagement close data 365 may be an amount of time for closing a conversation that is handled (including assistance) prior to closure without a response, including an amount of time to perform an action to close a respondless conversation. Non-engagement close data 365 may be a sum of non-engagement closing agent data 366 and non-engagement closing assistance data 367.

Non-engagement closing agent data 366, which may be referred to as "closing agent without engagement" handle time, can include data representing an amount of time an agent spends on a conversation via an agent computing device prior to closure. In this case, the agent is referred to as a "closing agent" who has closed a unengaged or responseless conversation (e.g., a conversation without a response) during a selected period of time. By contrast, non-engagement closing assistance data 367, which may be referred to as "closing assistant without engagement" handle time, may include data representing an amount of time an agent-user spends viewing or accessing a conversation that is closed without engagement or a response, where the agent-user does not perform a closing action.

The granularity of metric data provided by agent handle time metric data 351 may provide additional insight to resolving conversations and identifying unproductive behaviors or workflows. If agents are expected to respond to most or all of the conversations assigned to each agent, then agents may predominantly accrue "responses transmitted time" data 342 (i.e., "responses sent" handle time). But if an agent computing device is associated with unusual amounts of accrued "response(s) assisted time" data 344 (e.g., "responses assisted" handle time), this could indicate that an agent is "cherry picking" conversations by foregoing difficult conversations that require more effort or work to resolve. Or, relatively high amounts of "responses assisted" time may indicate that conversations are being assigned to an agent who may not have a sufficient level of expertise to address such conversations. Alternatively, an agent who is responsible for "triaging" conversations, such as applying tags, adding notes, or routing conversations to proper queues, may likely have a larger percentage amount of time attributed to response(s) assisted time data 344 (e.g., "responses assisted" handle time). Such feedback may be used to encourage that agent to focus more time in resolving conversations rather than just providing assistance.

Close time data 360 including wrap time data 361 metrics can be used to understand amounts of time each agent is spending on wrapping up a conversation having a response. Agents may be expected to spend some amount of time to wrap up a conversation by adding notes, tags, and the like before closing the conversation. However, if an agent is spending too much time wrapping conversations up, an agent's overall productivity may be detrimentally affected. Non-engagement close time data 365 may be monitored to determine whether agents are spending too much time handling non-actionable conversations. If agents are spending too much time closing conversations without engagement, there may be an opportunity to improve workflow routing and prioritization rules.

In-progress time data 350, which may be referred to as "in-progress" handle time, may describe an amount of time (e.g., unclassified time) during an activity being performed prior to classification to a type of activity to which in-progress time data 350 relates. For example, slices of time (e.g., segments of time) may include captured state data from an agent computing device, whereby a reclassification engine may be configured to reclassify portions of in-progress time data 350 as related to a specific action or activity type. For example, in-progress data 350 may be reclassified as response-related data if in-progress data 350 was generated prior to generation of a response as an action, the response being a result of activities associated with in-progress data 350. As another example, in-progress data 350 may be reclassified as close-related data if in-progress data 350 was generated prior to generation of a closing event as an action, the closing event also being a result of activities associated with in-progress data 350. Further, in-progress time data 350 may be configured to provide real-time (or near real-time) visibility into the amounts of time agents spend on working on conversations prior to taking a specific action, such as sending a response or closing a conversation. Note that in-progress time data 350 may be aggregated with total response data 340 and total close data 360 to establish an amount of time associated with a total digital conversation data 330.

Further to diagram 300, total digital conversation data 330, which may be referred to as "total conversation" handle time, may be the aggregate of amounts of time associated with in-focus active data 312 and out-of-focus active data 322. In some examples, total digital conversation data 330 may also be an aggregate (e.g., a sum) of amounts of time associated with response data 340, in-progress data 350, and close data 360. According to various examples, total digital conversation data 330 may include data representing an amount of time (e.g., an average amount of time) an agent views a conversation subsequently closed by any agent, based on conversations closed during a selected time frame. Hence, total digital conversation data 330 may include response handle time data 340 associated with a conversation and any wrap-up time data 361 (e.g., the time an agent views a conversation after a latest response but before the conversation was closed), as well as time associated with any non-engaged closed conversation. In view of the foregoing, "total conversation" handle time is an example of metric data based on action or activity-based metric data and application utilization metric data. In some examples, a "state of the digital conversation" may refer to data representing a "total conversation" handle time or any other state or metric or data value described here during exchanging electronic messages via a communication management platform.

Further to the exemplary hierarchy of data types of diagram 300, each of subsets of data 302 to 367 in FIG. 3 may be attributed to (or relate to) a specific agent computing device and/or agent who implements user interface functions set forth herein as computerized tools to service electronic messages, whereby data 302 to 367 may be used to enhance agent productivity and manage a workforce. In some cases, subsets of data 302 to 367 in FIG. 3 may be attributed to (or relate to) a group or team of agents. According to some additional examples, subsets of data 302 to 367 in FIG. 3 may be attributed to (or relate to) a specific conversation or aggregated multiple conversations. Note that references to a browser window are merely exemplary and is not intended to limit any window or tab to a browser application. Rather, a window or tab may be implemented in association with any application (e.g., a downloaded application disposed on a computing device, such as a mobile computing device or phone). In some examples, a window may reference to either functionality or structure, or both, of a user interface of any portion thereof. Also, subsets of data 302 to 367 in FIG. 3 may include any description of time (e.g., a start time, an end time, a duration, a period of time, an interval, and the like). Moreover, subsets of data 302 to 367 in FIG. 3 may include or link other types of data to facilitate analytics (e.g., identifiers to identify specific agents or groups of agents, as well as conversation identifiers to identify unique digital conversations) to track agent performance and plan scheduling for a workforce.

Figure 4:
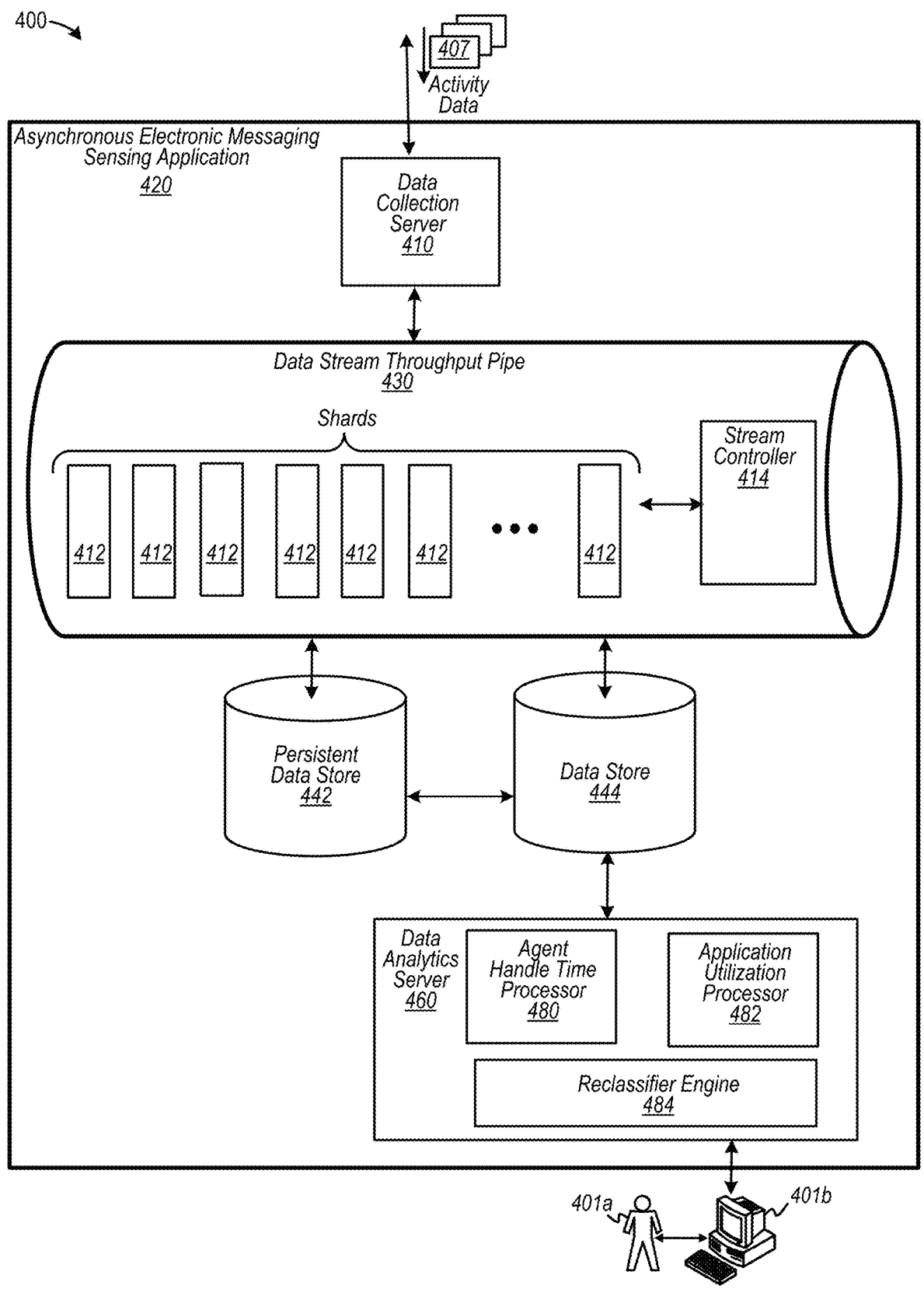
FIG. 4 depicts an asynchronous electronic messaging sensing application configured to sense functional states of data operations at agent computing devices to generate data for analysis, according to some examples.

FIG. 4 depicts an asynchronous electronic messaging sensing application configured to sense functional states of data operations at agent computing devices to generate data for analysis, according to some examples. Diagram 400 depicts an asynchronous electronic messaging sensing application 420 including a data collection server 410, a data stream throughput pipe 430, a persistent data store 442, a data store 444, and a data analytics server 460, which, in turn, is shown to include an agent handle time processor 480, an application utilization processor 482, and a reclassifier engine 484. Asynchronous electronic messaging sensing application 420 may be configured to receive subsets of activity state data 407 from any number of agent computing devices configured to perform activities and/or actions to facilitate levels of performance relative metrics described herein. Received data and generated metric data may assist in driving responsiveness to any number of asynchronous electronic messages received over different communications channels or social media networks, with an aim to enhancing customer engagement. Further, asynchronous electronic messaging sensing application 420 may be configured to receive activity data 407 as streams of data from which analytics data may be generated at data analytics server 460 for presentation and analysis at computing device 401b to assist user 401a to identify areas in which agent productivity and workforce management may be optimized.

Data collection server 410 can be configured as a Web server configured to transmit data into data stream throughput pipe 430. Data stream throughput pipe 430 may be configured as a data conduit or data channel (e.g., "data pipe") having a relatively ultra-high data throughput to transmit data for storage in persistent data store 442 and data store 444, whereby the stored data may be available in real-time (or near real-time) to generate instantaneous (or nearly instantaneous) metric data, such as the metric data described herein. Data collection server 410 may be optional in some examples. In some implementations, data stream throughput pipe 430 may be configured to provide, for example, sub-200 mS delivery speeds between data collection server 410 and either persistent data store 442 or data store 444, or both. In one example, data stream throughput pipe 430 may include any number of shards 412, each of which can support writes up to 1,000 records per second, as well as up to a data write total of 1 mebibyte ("MiB") per second (or faster). Stream controller 414 may include logic to consolidate data (e.g., consolidating time-sliced data records of 30 seconds into 5 minute time slices, as well as grouping data by data types, such as by agent identifier, entity, conversation identifiers, case numbers, actions, activity types, etc.).

Persistent data store 442 may be configured to store and retrieve any amount of data with any amount of data traffic according to, for example, a NoSQL data model. Ruby, Java, Python, C #, Erlang, P H P, and Perl, among others, may be suitable for writing into and reading data from persistent data store 442 (e.g., as a permanent data store). Data store 444 may be configured to include data mirrored (e.g., replicated data) in persistent data store 442, and may be configured to perform relatively fast data search capabilities, whereby data retrieval is at real-time (or near real-time) to provide near instantaneous generation of metric data and visualization thereof (e.g., data being updated every 5 minutes or sooner, such as at 30 second slices or less).

According to some examples, data collection server 410 may be configured to generate a stream of put-records for streaming into data stream throughput pipe 430. In one case, data collection server 410 can transmit data in accordance with streaming SQL or the like. In one example, data stream throughput pipe 430 can be implemented as a Kinesis Data Stream™ provided by Amazon® Web Services, and stream controller 414 may be implemented using a Kinesis Analytic application. In one instance, stream controller 414 may be configured to group subsets of the streams by organization or entity, by agent identifier or groups of agent identifiers, by a case or conversation identifier, and by activity type (e.g., a response, a close event, a request for approval, assistance activities, a request for expert assistance, a non-agent activity, idle activity, etc.). Further to the above example, persistent data store 442 may be configured as a DynamoDB™ provided by Amazon Web Services, and data store 444 may be implemented as an Elasticsearch cluster configured to implement an Elasticsearch service or engine, whereby Elasticsearch is maintained by Elasticsearch™ of Elasticsearch B.V. and Elastic N.V. of Amsterdam, Netherlands.

In the example shown, agent handle time processor 480 may include hardware or software, or a combination thereof, and may be configured to access and compute agent handle time metric data. Also, an application utilization processor 482 may include hardware or software, or a combination thereof, any of which may be configured to access and compute application utilization metric data. And reclassifier engine 484 may be configured to monitor in-progress metric data for analysis and presentation in an analytics user interface in computing device 401b. For example, reclassifier engine 484 may detect a subset of activities and/or an action at an agent computing device, whereby a subset of in-progress metric data may be reclassified as one of a response, a close event, a request for approval, assistance activities, a request for expert assistance, etc., based on a detected action.

Figure 5:
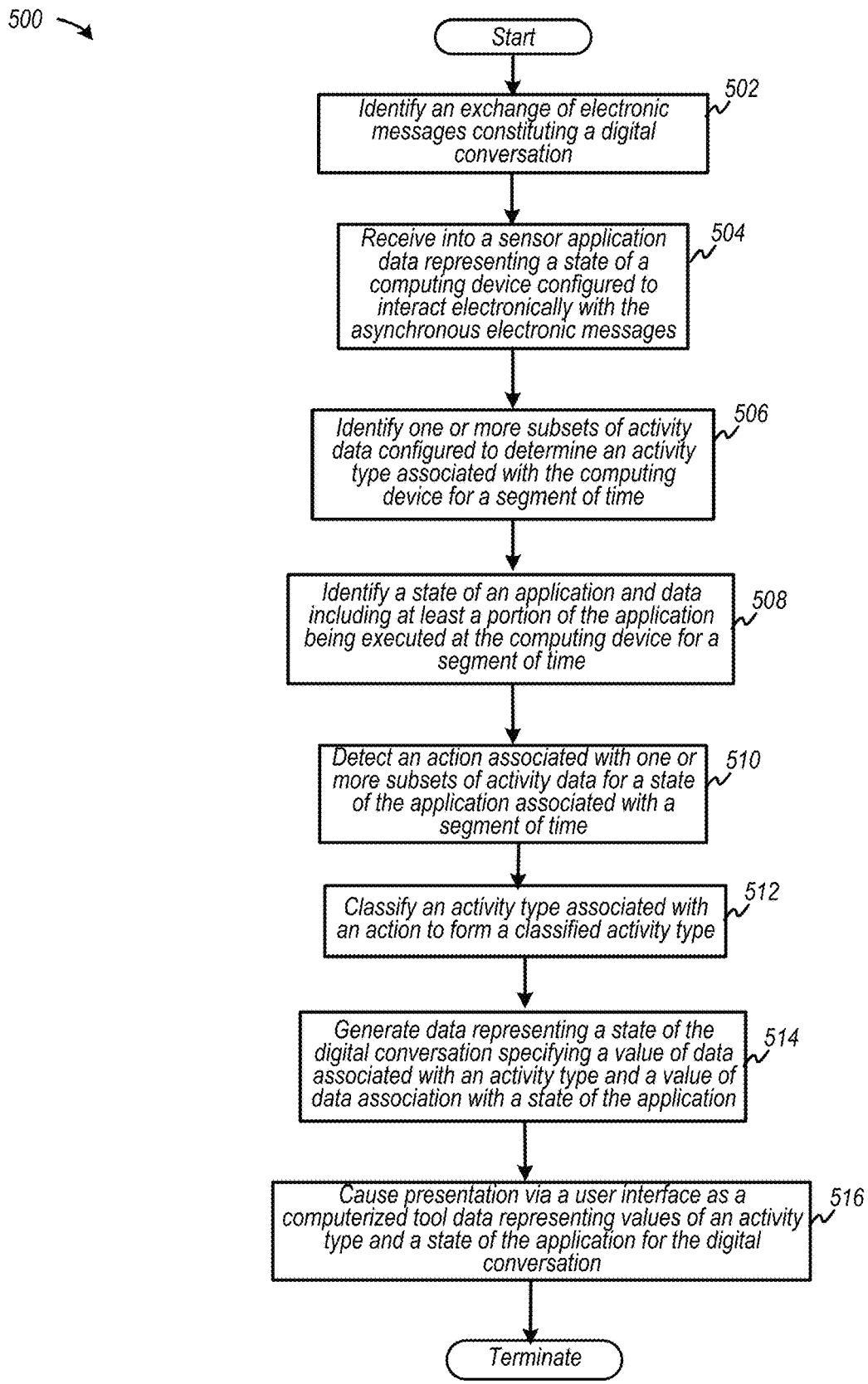
FIG. 5 is a flow diagram to determine states of an agent computing device, according to some examples.

FIG. 5 is a flow diagram to determine states of an agent computing device, according to some examples. Flow 500 describes one or more functionalities and/or subprocesses to generate application utilization metric data and agent handle time metric data, both of which may be used to detect one or more states of an agent computing device, a user interface, and/or application, one of more of which may be correlatable to actions of an agent-user that may be characterized against one or more productivity or performance metrics. Also, flow diagram 500 may be implemented in association with a computing platform, such as a communication management platform. An example of a communication management platform has been developed as a Khoros Care™ application by Khoros, LLC, of Austin, Tex. Further, flow diagram 500 may be facilitated via computerized tools including an application, which, in turn, may include at least an active user interface portion (e.g., a user interface 130a of FIG. 1). The active UI portion which may be configured to initiate and/or execute instructions to implement and monitor computerized tools to continuously (or nearly continuously) sense data that describes functional states of remote agent computing devices and/or user interfaces that are configured to service electronic messages.

At 502, an exchange of electronic messages constituting a digital conversation may be identified. The electronic messages may be communicated via a network as asynchronous electronic messages associated with one or more communication channels (e.g., one or more social media networks). In one example, the identification of an exchange of electronic messages may include identifying a channel of communication with which to generate an action, such as a response. According to some examples, the term "digital conversation" may include a grouping of exchanged electronic messages that can be configured to implement at least two-way communication originating when a first electronic message is transmitted and one or more electronic messages are exchanged as one or more responses. A digital conversation (or "conversation") may be uniquely identified by a conversation identifier (e.g., an alpha-numeric number) or by a case number.

At 504, data representing a state of a computing device configured to interact electronically with the asynchronous electronic messages may be received into a sensor application, such as either a communication management platform application or a an asynchronous electronic messaging sensing application, or both, or any portion thereof. The data representing a state of the computing device may be received in segments of time, or "slices of time" or "time slices."

In various examples, executable instructions may be disposed in an application in communication with (or associated with) an agent computing device to monitor states of agent computing device or functionalities thereof. In one instance, a state of an agent computing device may be determined by extracting data representing states of application utilization and activity (e.g., activity types). Further, the executable instructions may be in communication via a network with a browser application that may be configured to identify data from which metric data may be derived, determined, or acquired at each segment of time, whereby each segment of time may be determined periodically or aperiodically. Or, the executable instructions may be configured to configure other executable instructions associated with a browser (or other applications) to perform various functions. In some examples, each segment of time may be determined by one or more software timers. In accordance with one implementation, a browser application may be configured to implement JavaScript™ timers in association with user interfaces of an agent computing device to track an amount of time an agent-user spends performing various activities and actions by interacting with a communication management platform application or a an asynchronous electronic messaging sensing application, or both. Note that an application including the above-described executable instructions need not be limited to a browser application, but can be any type of application. The executable instructions may be implemented as an applications programming interface ("API"). Alternatively, the application may be implemented as middleware (or a variant thereof), or any computing platform and system, database, computing architecture, etc. Also, timer-related data (e.g., metadata) may be received at 504, whereby timer-related data may specify a global state of an application and whether a window (or tab), such as browser window, is "in-focus" or "out-of-focus." Timer-related data may also include accumulated time that one or more agent-users interact with specific "windows," tabs, or screens, as well as attributes (e.g., characterized details) of a unit of work ("a conversation") subject to one or more agent activities or actions.

At 506, one or more subsets of activity data may be identified to determine an activity type associated with an agent computing device for a segment of time. In some examples, one or more subsets of activity data may be delineated as data representing an unclassified action type.

At 508, data representing a state of agent computing device, a user interface, and/or an application may be identified. The state of an application may include data describing at least a portion of the application (e.g., a state of the portion of the application) being executed at an agent computing device for a segment of time. In some examples, identifying a state of an application may include detecting a portion of a communication management platform application is active. For example, one state of the communication management platform application may indicate that the application is "in-focus." In one case, an active user interface portion may include data representing a conversation with which an agent may interact. As another example, another state of the communication management platform application indicates that the application is "out-of-focus." For instance, an agent-user may transition interactions with a user interface to interact with another application, thereby causing the previously-accessed communication management platform application being identified as "out-of-focus."

At 510, data representing an action associated with one or more subsets of activity may be detected associated with the segment of time. At 512, one or more subsets of activity data may be classified based on the action to form a classified activity type. For example, an activity type for the segment of time may be reclassified from an in-progress classification to a "response activity" type. Or, one or more subsets of activity data may be reclassified for a segment of time from an in-progress classification to a "close activity" type At 514, data representing a state of a digital conversation may be generated. The data may be configured to specify a value of data associated with an activity type and a value of data associated with a state of the application, whereby the values of data may be numeric or text (e.g., a text-based identifier). A value may also be representative of an amount of time (e.g., 25 hours and 18 minutes). For example, values of an activity type may specify a "response" value for an action, a "close" value for an action, an "approval" response value for an action associated with approving a response, an "assistance" value for an action in which an agent assists in forming a response or closes a conversation, an "expert" value for an assistance request, and the like. In some examples, data representing one or more metrics may be generated as a function of an in-focus state of the application and the classified activity type. Further, data configured to present a metric in an analytic user interface may be generated to provide, for example, application utilization metric data and/or agent handle time metric data, according to some implementations.

At 516, data representing values of an activity type and a state of the application as metric data for a digital conversation may be presented in a user interface configured as a computerized tool. A computerized tool, for example, may be any user input or subset of executable instructions configured to service electronic messages, which may be monitored or tracked to facilitate continuous (or nearly continuous) sensing of data that describes functional states of agent computing devices and/or user interfaces configured to service electronic messages.

Figure 6:
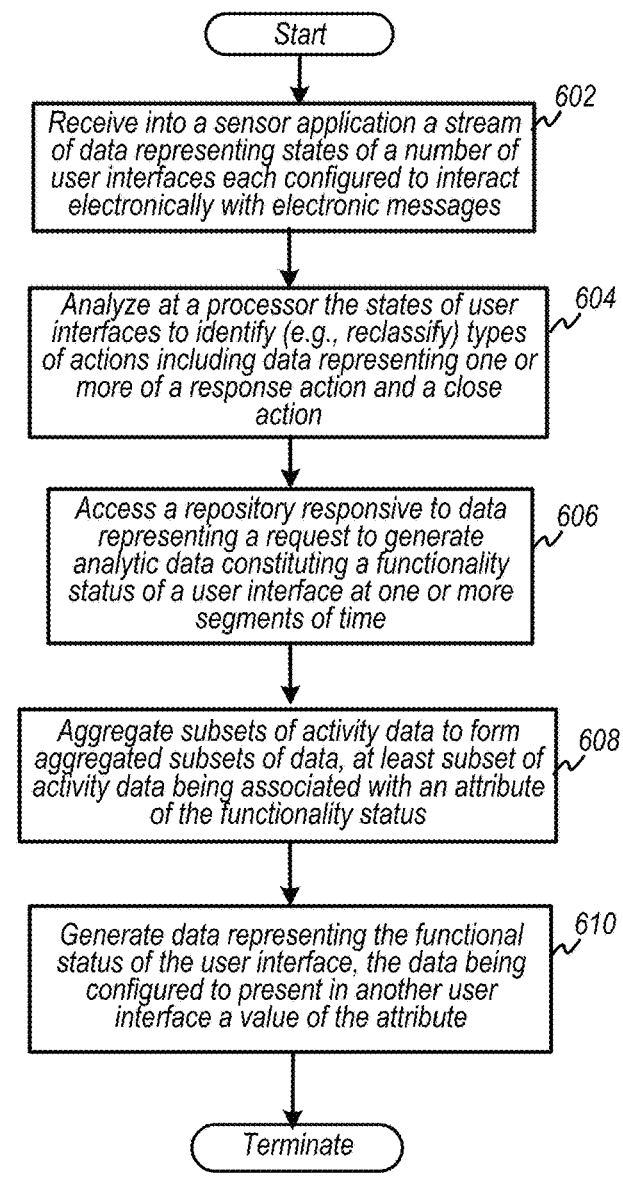
FIG. 6 is another flow diagram to determine states of an agent computing device, according to some examples.

FIG. 6 is another flow diagram to determine states of an agent computing device, according to some examples. At 602, a stream of data representing states of a number of user interfaces may be received via a network into a sensor application. Each user interface may be associated with a computing device that is configured to interact electronically with electronic messages. In some examples, a stream of data may be received as batches of data representing groups of electronic messages.

At 604, states of a number of user interfaces may be analyzed to identify types of activity including data representing one or more of a response action and a close action. At 606, a repository may be accessed responsive to data representing a request to generate analytic data constituting a functionality status of a user interface at one or more segments of time. In some examples, a functionality status of the user interface may be indicative or representative of productivity data that describe performance or productivity of an agent. For example, a functionality status of the user interface may be include application utilization metric data and agent handle time metric data, and the like, for one agent aggregated over a number of conversations per period of time, or for a group of agents aggregated over one or more conversations per period of time, or for a conversation aggregated over one or more agents, activities, actions, etc., and other metric data.

At 608, subsets of activity data may be aggregated to form aggregated subsets of data. At least one subset of activity data may be associated with an attribute of a functionality status. To illustrate, consider that subsets of activity data may be aggregated based on a conversation identifier. Next, consider that multiple agents were involved in drafting and approving transmission of responses, as well as a number of agents being consulted to provide expert assistance. So, "total response time" metric data may include an aggregation of each of a number of agents providing responses. Further, a subset of activity data may be associated with one or more attributes specifying, for example, an "in-view," or active state, a state of one or more queues, an indication that an application is "in-focus," as well as an indication associated with classified activities indicating whether a response includes supplemental data (e.g., data derived from an assisting agent, an approving agent, and/or an expert agent), or whether a closing action is, for example, with engagement (e.g., a response had been sent). Therefore, as used herein, the term "attribute" may refer to any characteristic of metric data and any characteristic describing a state of an application. An attribute may include a data value (e.g., an amount of time) for a particular metric, such as response handle time, etc. In some examples, an attribute may refer to any data portion of an extracted data record, such as data record 207 in FIG. 2. As such, each subset of data 207a to 207n, as well as any other subset, may be identified as an attribute, according to some examples.

At 610, data representing a functional status of a remote user interface (or computing device) may be generated. The data may be configured to present in another user interface (e.g., an analytics user interface) a value of an attribute, which may be implemented to describe performance of a portion of an application or an agent computing device. As performance of an agent-user is correlatable to performance of a portion of an application or an agent computing device, productivity of the agent-user may be determined (e.g., in terms of application utilization and agent handle times, both of which may be used to form a total conversation handle time for an agent).

Figure 7:
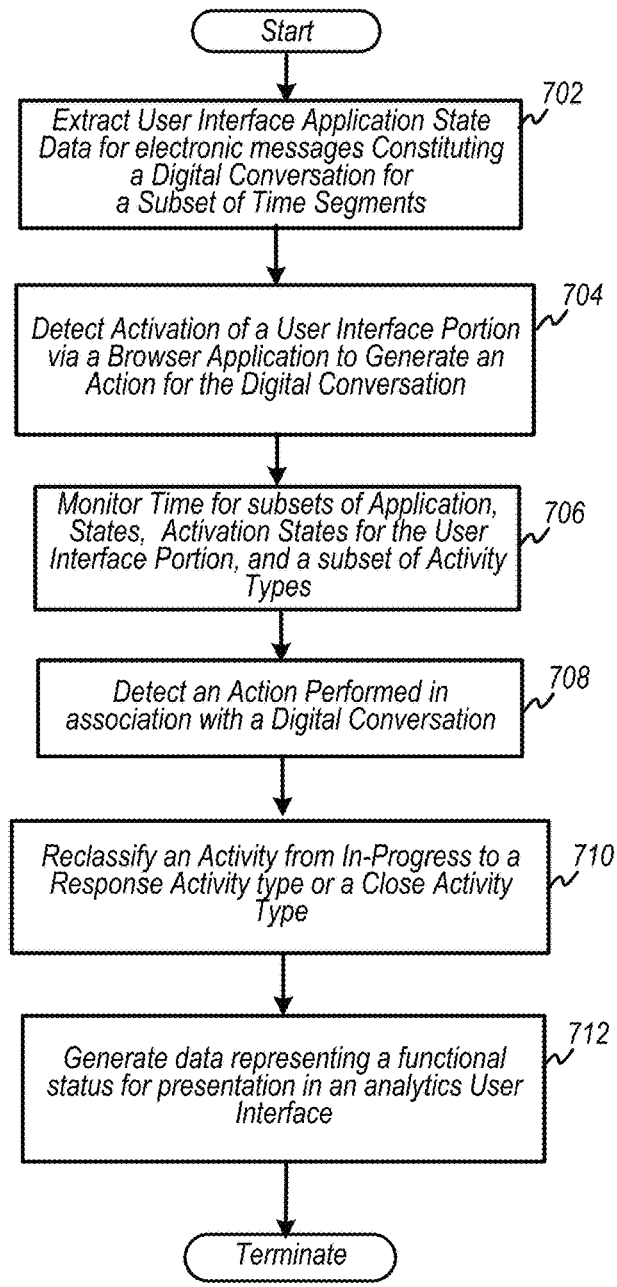
FIG. 7 is yet another example of a flow diagram to determine states of an agent computing device, according to some examples.

FIG. 7 is yet another example of a flow diagram to determine states of an agent computing device, according to some examples. At 702, data representing a user interface application state may be extracted from a user interface interacting with electronic messages constituting a digital conversation. The user interface applications state may be extracted during a subset of time segments or slices of time. In some examples, user interface application state may refer to a state of executable instructions configured to either generate or interact with a user interface, or both.

At 704, activation of a user interface portion may be detected via a browser application. Further, activation of the user interface portion may be configured to generate executable instructions for presenting a user input in the user interface portion, which may be configured to activate an action in association with a digital conversation. In particular, activation of a user interface portion may cause a number of user inputs to be presented. Each user input may constitute a computerized tool with which to analyze data, initiate execution of instructions, and generate data representing application utilization metric data and agent handle time metric data.

At 706, an amount of time may be monitored or determined for a subset of application states (e.g., an application utilization state including an "in-focus" state or an "out-of-focus" state, as well as additional states in combination with other attributes, such as states of one or more queues, etc.), a subset of activation states for a user interface portion (e.g., whether an active UI portion is in an active state or inactive state), and a subset of activity types (e.g., whether an activity is a response or a closing event, among others, or whether an activity is associated with "providing assistance only," "providing approval," "providing expert assistance," etc.).

At 708, an action performed in association with a digital conversation may be detected. At 710, an activity (e.g., as specified by an activity type) may be classified or reclassified from an indication of "in-progress" to, for example, a response activity or a close activity" based on the detected action at 708. At 712, data representing a functional status may be generated for presentation in an analytics user interface, an example of which is shown in FIGS. 8A and 8B.

FIGS. 8A and 8B are examples of user interfaces configured to generate and present granular subsets of metric data to present a state of an agent computing device in real-time or nearly in real-time, according to some examples. Diagram 800 of FIG. 8A depicts an analytics user interface 802 configured to present agent handle time metric data, such as agent handle time metric data 351 of FIG. 3. As shown, analytics user interface 802 depicts a visual representation of a conversation handle time 810 (e.g., a total amount of time associated with a conversation associated with an agent). As FIG. 3 indicates, total digital conversation metric data 330 may be composed of response handle time metric data 340, in-progress metric data 350, and close metric data 360. Referring to FIG. 8A, response handle time metric data 340, in-progress metric data 350, and close metric data 360 may respectively be presented as response handle time metric data 820, in-progress metric data 812, and close handle metric data 814. Note that response handle time metric data 820 is shown to include an assistance response handle time ("RHT") 862, an expert RHT 864, an approver RHT 866, and a responder handle time 868. A user may drill down further into response handle time 820 by using selecting device 830, such as cursor (or other selecting mechanisms), to expand response handle time metric data 820 as shown in user interface 852 of diagram 850 in FIG. 8B. Further, additional metric data 880 is also presented, such as data representing a number of conversations handled 882, data representing an average conversation handle time 884, data representing an average response handle time 886, and data representing a number of responses handled 888.

Figure 9:
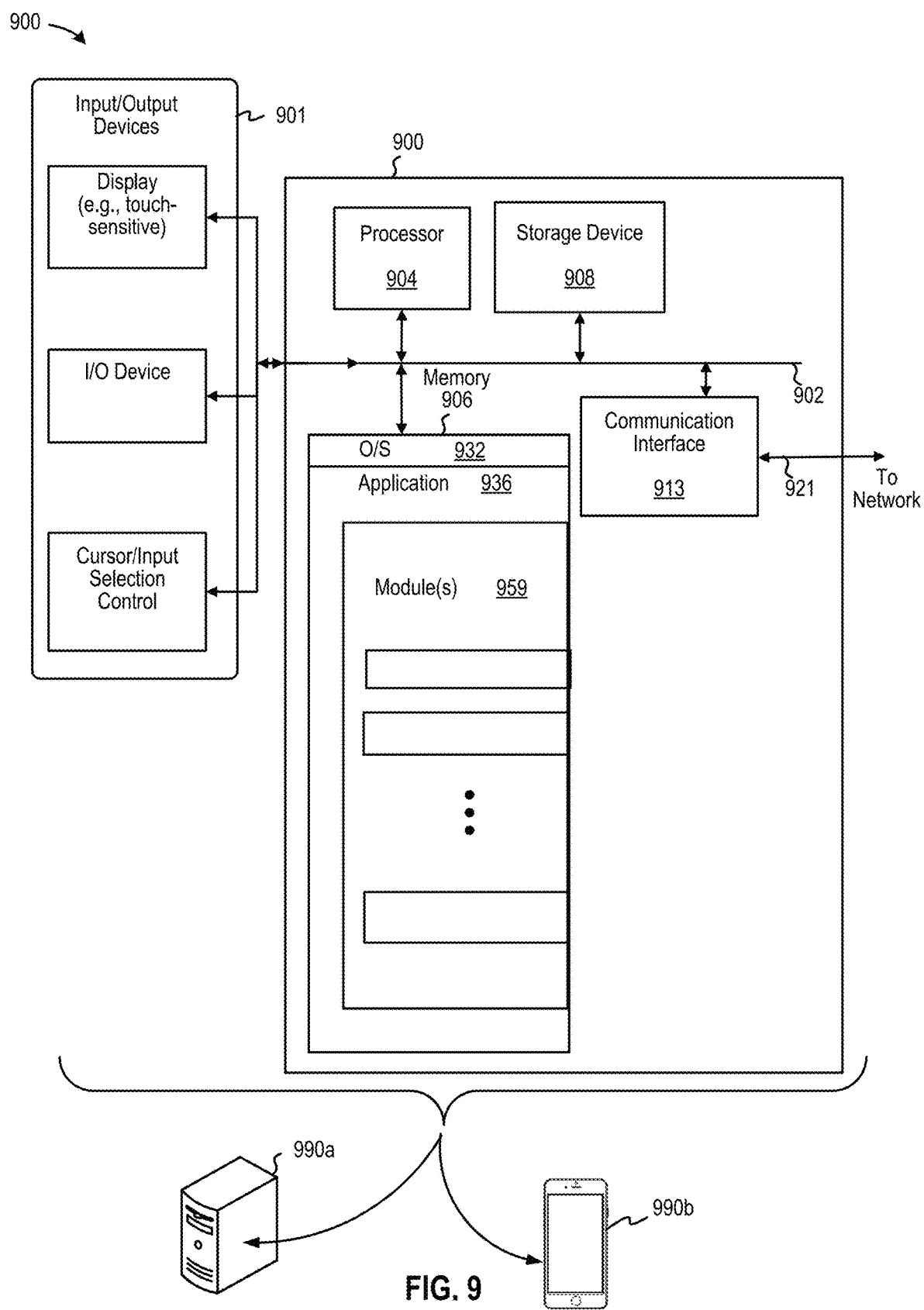
FIG. 9 illustrates examples of various computing platforms configured to provide various functionalities to any of one or more components of a communication management platform, according to various embodiments.

FIG. 9 illustrates examples of various computing platforms configured to provide various functionalities to any of one or more components of a communication management platform, according to various embodiments. In some examples, computing platform 900 may be used to implement computer programs, applications, methods, processes, algorithms, or other software, as well as any hardware implementation thereof, to perform the above-described techniques.

In some cases, computing platform 900 or any portion (e.g., any structural or functional portion) can be disposed in any device, such as a computing device 990a, mobile computing device 990b, and/or a processing circuit in association with initiating actions or processes in accordance with various examples described herein.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), an in-memory cache, such as cache memory 904a (e.g., L1 cache integrated with processor 904, such as an on-board cache) or cache memory 904b (e.g., L2 and/or L3 cache memories 904b), whereby cache memory 904a or 904b may be implemented in RAM 906 or other portions of computing platform 900 (in some examples), a communication interface 913 (e.g., an Ethernet or wireless controller, a Bluetooth controller, NFC logic, etc.) to facilitate communications via a port on communication link 921 to communicate, for example, with a computing device, including mobile computing and/or communication devices with processors, including database devices (e.g., storage devices configured to store atomized datasets, including, but not limited to triplestores, etc.). Processor 904 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 901 may be implemented as, or otherwise substituted with, a user interface in a computing device associated with a user account identifier in accordance with the various examples described herein.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown in FIG. 9, system memory 906 may include any number of modules 959, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++, C #, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 959 of FIG. 9, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 959 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:

identifying an exchange of electronic messages constituting a digital conversation, the electronic messages being communicated via a network as asynchronous electronic messages;

receiving into a sensor application data representing a state of a computing device configured to interact electronically with the asynchronous electronic messages, the data representing the state of the computing device in segments of time;

identifying one or more subsets of activity data configured to determine an activity type associated with the computing device for a segment of time;

identifying data representing a state of an application, the state of the application including data representing an in-focus state of the application at which at least a portion of the application is executed at the computing device in the segment of time or data representing an out-of-focus state of the application at which at least the portion or another portion of the application is executed in a prior segment of time;

detecting data representing an action associated with the one or more subsets of activity data associated with the segment of time;

classifying the one or more subsets of activity data based on the action to form a classified activity type based on an agent-user role associated with the computing device;

generating data representing a state of the digital conversation, the data being configured to present in a user interface a value of data associated with the activity type and a value of data associated with the state of the application including one or more of the in-focus state and the out-of-focus state;

aggregating a first subset of the segments of time associated with the in-focus state and a second subset of the segments of time associated with the out-of-focus state to form aggregated segments of time; and causing presentation via the user interface as a computerized tool a data representation of the value of data associated with the activity type and the value of data association with the state of the application configured to interact with the digital conversation, the state of the application being associated with at least a portion of the aggregated segments of time.

2. The method of claim 1 further comprising:
disposing executable instructions in an application associated with the computing device.

3. The method of claim 2 wherein disposing the executable instructions further comprises:
executing instructions to extract data based on timer-related data, the data extracted at each segment of time.

4. The method of claim 1 wherein identifying data representing the state of the application further comprises:
detecting a communication management platform application is active.

5. The method of claim 1 wherein identifying data representing the state of the application further comprises:
detecting execution of another application subsequent to executing instructions associated with a communication management platform.

6. The method of claim 1 wherein classifying the activity type associated with the action to form the classified activity type further comprises:
reclassifying the activity type for the segment of time from an in-progress classification to a response action.

7. The method of claim 1 wherein classifying the activity type associated with the action to form the classified activity type further comprises:
reclassifying the activity type for the segment of time from an in-progress classification to a close action.

8. The method of claim 1 wherein generating data representing the state of the application further comprises:
generating data representing a metric as a function of the in-focus state of the application and the classified activity type.

9. The method of claim 8 further comprising:
generating data to present the metric in an analytic user interface.

10. The method of claim 1 wherein identifying the exchange of electronic messages constituting the digital conversation comprises:
identifying a channel of communication with which to generate a response.

11. A method comprising:
receiving into a sensor application via a network a stream of data representing states of a plurality of user interfaces each of which is associated with a computing device configured to interact electronically with electronic messages;
analyzing at a processor the states of the plurality of user interfaces to identify types of activity including data representing one or more of a response action and a close action, each type of activity associated with an agent-user role associated with the computing device;
accessing a repository responsive to data representing a request to generate analytic data constituting a functionality status of a user interface at one or more segments of time, the functionality of the user interface being associated with an in-focus state of the application during a first subset of segments of time or an out-of-focus state of the during a second subset of segments of time;
aggregating subsets of activity data to form aggregated subsets of data, at least one subset of activity data being associated with an attribute of the functionality status;
identifying a first subset of the aggregated subsets of data associated with the first subset of segments of time and a second subset of the aggregated subsets of data associated with the second subset of segments of time to form identified amounts of time; and
generating data representing the functional status of the user interface, the data being configured to present in another user interface a value of the attribute and at least a portion of the identified amounts of time.

12. The method of claim 11 wherein receiving the stream of data comprises:
receiving batches of the data representing a plurality of groups of electronic messages.

13. The method of claim 11 further comprising:
storing the data representing the states of the plurality of user interfaces in the repository including data representing the subsets of activity data.

14. The method of claim 11 further comprising:
receiving another request to generate data associated with an identifier for a group of the electronic messages constituting a digital conversation;
generating data representing the functional status of the user interface and other functional statuses of other user interfaces associated with the digital conversation; and
causing presentation of values of attributes for the functional status of the user interface and other functional statuses of other user interfaces.

15. The method of claim 11 wherein aggregating the subsets of activity data comprises:
grouping subsets of data based on an application in-focus state metric, a user interface portion active state metric, a response activity state metric, and a close activity state metric.

16. A system comprising:
a data store configured to receive a stream of data via a network into a sensing application computing platform, the stream of data including data representing states of a plurality of user interfaces each of which is association with a computing device configured to interact electronically with electronic messages; and
a processor configured to execute instructions to implement a sensing application configured to:
analyze at a processor the states of the plurality of user interfaces to identify types of actions including data representing one or more of a response action and a close action, each type of activity associated with an agent-user role associated with the computing device;
access a repository responsive to data representing a request to generate analytic data constituting a functionality status of a user interface at one or more segments of time, the functionality of the user interface being associated with an in-focus state of the application during a first subset of segments of time or an out-of-focus state of the during a second subset of segments of time;
aggregate subsets of activity data to form aggregated subsets of data, at least subset of activity data being associated with an attribute of the functionality status;
identify a first subset of the aggregated subsets of data associated with the first subset of segments of time and a second subset of the aggregated subsets of data associated with the second subset of segments of time to form identified amounts of time; and
generate data representing the functional status of the user interface, the data being configured to present in another user interface a value of the attribute and at least a portion of the identified amounts of time.

17. The system of claim 16, wherein the processor configured to receive the stream of data is further configured to:
receive batches of the data representing the plurality of groups of electronic messages.

18. The system of claim 16, wherein the processor is further configured to:
store the data representing the states of the plurality of user interfaces in the data store to include data representing the subsets of activity data.

19. The system of claim 16, wherein the processor is further configured to:
receive another request to generate data associated with an identifier for a group of the electronic messages constituting a digital conversation;
generate data representing the functional status of the user interface and other functional statuses of other user interfaces associated with the digital conversation; and
cause presentation of values of attributes for the functional status of the user interface and other functional statuses of other user interfaces.

20. The system of claim 16, wherein the processor configured to aggregate the subsets of activity data is further configured to:
group subsets of data based on an application active state metric, a user interface portion active state metric, a response activity state metric, and a close activity state metric.

* * * * *